United States Patent [19]
Miller et al.

[11] Patent Number: 5,867,238
[45] Date of Patent: Feb. 2, 1999

[54] POLYMER-DISPERSED LIQUID CRYSTAL DEVICE HAVING AN ULTRAVIOLET-POLYMERIZABLE MATRIX AND A VARIABLE OPTICAL TRANSMISSION AND A METHOD FOR PREPARING SAME

[75] Inventors: Stephen A. Miller, St. Paul, Minn.; William A. Huffman, Pittsford, N.Y.; Laurence R. Gilbert, Marine-On St. Croix, Minn.; George F. Vesley, Hudson, Wis.

[73] Assignee: Minnesota Mining and Manufacturing Company, St. Paul, Minn.

[21] Appl. No.: 698,443

[22] Filed: Aug. 19, 1996

Related U.S. Application Data

[63] Continuation of Ser. No. 341,699, Nov. 18, 1994, abandoned, which is a continuation of Ser. No. 121,964, Sep. 15, 1993, abandoned, which is a continuation of Ser. No. 819,260, Jan. 10, 1992, abandoned, which is a continuation-in-part of Ser. No. 640,034, Jan. 11, 1991, abandoned.

[51] Int. Cl.$^6$ .................................................. G02F 1/1333
[52] U.S. Cl. .................................................. 349/92; 349/86
[58] Field of Search .......................... 359/51, 52; 349/92, 349/93, 158, 80

[56] References Cited

U.S. PATENT DOCUMENTS

| | | | |
|---|---|---|---|
| 3,371,986 | 3/1968 | Fergason | 350/150 |
| 3,935,337 | 1/1976 | Taylor | 427/180 |
| 4,017,661 | 4/1977 | Gillery | 428/412 |
| 4,411,495 | 10/1983 | Beni et al. | 350/347 |
| 4,435,047 | 3/1984 | Fergason | 350/334 |
| 4,501,503 | 2/1985 | Buirley et al. | 374/126 |
| 4,556,289 | 12/1985 | Fergason | 350/350 |
| 4,616,903 | 10/1986 | Fergason | 350/334 |
| 4,671,618 | 6/1987 | Wu et al. | 350/347 |
| 4,673,255 | 6/1987 | West et al. | 350/347 |
| 4,685,771 | 8/1987 | West et al. | 350/347 |
| 4,688,900 | 8/1987 | Doane et al. | 350/347 |
| 4,699,470 | 10/1987 | McLaughlin et al. | 350/334 |
| 4,707,080 | 11/1987 | Fergason | 350/334 |
| 4,728,547 | 3/1988 | Vaz et al. | 428/1 |
| 4,749,261 | 6/1988 | McLaughlin et al. | 350/339 |
| 4,789,858 | 12/1988 | Fergason et al. | 340/784 |
| 4,834,509 | 5/1989 | Gunjima et al. | 350/347 |
| 4,888,126 | 12/1989 | Mullen et al. | 252/299.5 |
| 4,891,152 | 1/1990 | Miller et al. | 252/299.01 |
| 4,896,946 | 1/1990 | Suzuki et al. | 359/88 |
| 4,911,536 | 3/1990 | Ditzik | 350/351 |

(List continued on next page.)

FOREIGN PATENT DOCUMENTS

WO 85/0462  9/1985  WIPO .

OTHER PUBLICATIONS

H. G. Craighead et al., "New Display Based on Electrically Induced Index Matching in an Inhomogenous Medium," *Appl. Phy. Lett.*, vol. 40(1), pp. 22–24, 1982.

(List continued on next page.)

*Primary Examiner*—William L. Sikes
*Assistant Examiner*—Kenneth Parker
*Attorney, Agent, or Firm*—Leland D. Schultz

[57] ABSTRACT

A polymer-dispersed liquid crystal device comprises a multiplicity of droplets of a birefringent, functionally nematic liquid crystal material dispersed in a matrix comprising the reaction product of ultraviolet radiation polymerizable materials. The device specularly transmits incident light as a function of the magnitude of an electric field applied across the device. The difference between a first applied voltage corresponding to a first percentage of the total incident light transmitted by the device as specular light and a second applied voltage corresponding to a second percentage of the total incident light transmitted by the device as specular light is greater than or equal to 15 volts. As a result, a polymer-dispersed liquid crystal device according to the invention displays a variable grey scale which has a uniform optical transmission. A method for preparing a PDLC device in general is also disclosed.

46 Claims, 4 Drawing Sheets

U.S. PATENT DOCUMENTS

| | | | |
|---|---|---|---|
| 4,938,568 | 7/1990 | Magerum et al. | 350/334 |
| 4,944,576 | 7/1990 | Lacker et al. | 350/334 |
| 4,950,052 | 8/1990 | Fergason et al. | 350/334 |
| 4,971,719 | 11/1990 | Vaz et al. | 252/299 |
| 4,973,511 | 11/1990 | Farmer et al. | 428/216 |
| 4,992,201 | 2/1991 | Pearlman | 252/299.1 |
| 5,009,044 | 4/1991 | Baughman et al. | 359/51 |
| 5,011,624 | 4/1991 | Yamagishi et al. | 252/299.5 |

OTHER PUBLICATIONS

J. W. Doane et al., "Polymer Dispersed Liquid Crystals for Display Application," *Mol. Cryst. Liq. Cryst.*, vol. 165, pp. 511–532, 1988.

G. Paul Montgomery, Jr., "Polymer–Dispered and Encapsulated Liquid Crystal Films," *Large–Area Chromogenics: Materials and Devices for Transmittance Control*, SPIE Institute Series vol. 1S4, pp. 577–606.

John L. West, "Phase Separation of Liquid Crystals in Polymers," *Mol. Cryst. Liq. Cryst. Inc. Nonlin. Opt.*, vol. 157, pp. 427–441, 1988.

Nuno A. Vaz et al., "A Light Control Film Composed of Liquid Crystal Droplets Dispersed in a UV–Curable Polymer," *Mol. Cryst. Liq. Cryst. Inc. Nonlin. Opt.*, vol. 146, pp. 1–15, 1987.

Nuno A. Vaz, "Polymer–Dispered Liquid Crystal Films: Materials and Applications," *Liquid Crystal Chemistry, Physics, and Applications*, SPIE vol. 1080. pp. 2–10, 1989.

Frederick G. Yamagishi et al., "Morpholigical Control in Polymer–Dispersed Liquid Crystal Film Matrices," *Liquid Crystal Chemistry, Physics and Applications*, SPIE vol. 1080, pp. 24–31, 1989.

A. M. Lackner, et al., "Droplet Size Control in Polymer Dispersed Liquid Crystal Films," *Liquid Crystal Chemistry, Physics, and Applications*, SPIE vol. 1080, pp. 53–61, 1989.

G. Paul Montgomery, Jr. et al., "Temperature–Dependent Electro–Optic Performance of Polymer–Dispersed Liquid Crystal Films," *Automotive Displays and Industrial Illumination*, SPIE vol. 958, pp. 104–111, 1988.

Paul S. Drzaic, "Polymer Dispersed Nematic Liquid Crystal for Large Area Displays and Light Valves," *J. Appl. Phys.*, 60(6), pp. 2142–2148, Sep. 15, 1986.

Peter van Konynenburg et al., "Solar Radiation Control using NCAP Liquid Crystal Technology," *Optical Materials Technology for Energy Efficiency and Solar Energy Conversion VI*, SPIE vol. 823, pp. 143–150, 1987.

Peter van Konynenburg et al., "Optical and Enviromental Properties of NCAP Glazing Products," *Liquid Crystal Chemistry, Physics, and Applications*, SPIE vol. 1080, pp. 62–69, 1989.

Paul S. Drzaic, "Droplet Shape and Reorientation in Nematic Droplet/Polymer Films," *Liquid Crystals*, vol. 5, No. 5, pp. 1467–1475, 1989.

Paul S. Drzaic, "Droplet Size and Shape Effects in Nematic Droplet/Polymer Films," *Liquid Crystal Displays and Applications*, SPIE vol. 1257, pp. 29–36, 1990.

J. W. Doane et al. "Field Controlled Light Scaterring from Nematic Microdroplets," *Appl. Phys. Lett.*, 48(4), pp. 269–271, Jan. 27, 1986.

Nuno A. Vaz et al., "A Light Control Film Composed of Liquid Crystal Droplets Dispersed in an Epoxy Matrix," *Mol. Cryst. Liq. Cryst.*, vol. 146, pp. 17–34, 1987.

George W. Smith et al., "The Relationship between Formation Kinetics and Microdroplet Size of Epoxy–Based Polymer–Dispersed Liquid Crystals," *Liquid Crystals*, vol. 3, No. 5, pp. 543–571, 1988.

Bao–Gang Wu et al., "Response Times and Voltages for PDLC Light Shutters," *Liquid Crystals*, vol. 5, No. 5, pp. 1453–1465, 1989.

R. L. Sutherland, "Optical Limiters, Switches, and Filters Based on Polyemr Dispersed Liquid Crystals," *Liquid Crystal Chemistry, Physics and Applications*, SPIE vol. 1080, pp. 83–90, 1989.

Joe B. Whitehead, Jr. et al., "Light Transmission and Scattering of Polymer Dispersed Liquid Crystals," *Liquid Crystal Chemistry, Physics and Applications*, SPIE vol. 1080, pp. 250–257, 1989.

A Fuh et al., "Polymer Dispersed Nematic Liquid Crystal Films: The Density Ratio and Polymer's Curing Rate Effects," *J. Appl. Phys.*, 66(11) pp. 5278–5284, Dec. 1, 1989.

POLYMER-DISPERSED LIQUID CRYSTAL DEVICE HAVING AN ULTRAVIOLET-POLYMERIZABLE MATRIX AND A VARIABLE OPTICAL TRANSMISSION AND A METHOD FOR PREPARING SAME

CROSS-REFERENCE TO RELATED APPLICATIONS

This is a continuation of application Ser. No. 08/341,699 filed Nov. 18, 1994, now abandoned, which is a continuation of application Ser. No. 08/121,964 filed Sep. 15, 1993 now abandoned, which is a continuation of U.S. patent application Ser. No. 07/819,260, filed Jan. 10, 1992, now abandoned, which is a continuation-in-part of U.S. patent application Ser. No. 07/640,034, filed Jan. 11, 1991. This application is also related to Gilbert et al., U.S. patent application Ser. No. 07/819,274, entitled "Light Modulating Devices Incorporating an Improved Electrode" filed concurrently with the present application, assigned to the same assignee as the present application, and which is hereby incorporated by reference, and which is now abandoned.

BACKGROUND OF THE INVENTION

1. Field of the Invention

This invention relates to a polymer-dispersed liquid crystal device (hereinafter referred to as a "PDLC device") and, more particularly, to a PDLC device which is based on an ultraviolet polymerizable matrix. Devices according to the invention display a selectively adjustable, variable transmission of specular light as a function of applied voltage. This invention also relates to a method for preparing PDLC devices generally.

2. Description of the Related Art

PDLC devices generally comprise droplets of a biaxially birefringent, nematic liquid crystal material dispersed in a transparent polymeric matrix. PDLC devices are of interest because they can be electrically controlled or switched between relatively translucent (i.e. light scattering) and relatively transparent (i.e. light transmitting) states. This occurs because the liquid crystal droplets exhibit birefringence. As a result, the droplets strongly scatter light when they are randomly oriented in the matrix and the PDLC devices appear translucent. However, upon the application of either an electric field or a magnetic field, the droplets become aligned along the direction of the electric/magnetic field vector and more directly transmit light. Alternatively, the droplets can be thermally stressed to induce alignment.

If the refractive indices of the liquid crystal material and the polymeric matrix are closely matched while in the field-induced, aligned state, the devices appear transparent. Thus, upon the application of an electric field, a magnetic field, or a thermal stress, PDLC devices switch from a state in which they appear translucent to a state in which they appear transparent. Upon removal of the electric field, the magnetic field, or the thermal stress, the devices revert to a translucent state.

PDLC devices are sometimes described as being switchable between opaque and transparent states. Strictly interpreted, the description of PDLC devices in the "field-off" state as "opaque" is not correct. However, the terms "opaque" and "translucent" have apparently been used synonymously and there seems to be no significant misunderstanding regarding the functional appearance of the devices. More accurately, PDLC devices in the field-off, nonaligned state transmit light, but the light is dispersed to the extent that images viewed through the devices appear cloudy or diffuse. That is, the PDLC devices are translucent. Truly "opaque" devices do not transmit light.

PDLC devices have found use as light valves, filters and shutters. The devices have also been used in information display arrangements where it is desirable to have a sharp, rapidly achieved contrast between the translucent and transparent states for addressing purposes such as is required for multiplexing. By "sharp" it is meant that the devices experience a substantial change in the percentage of light incident upon the device which can be specularly transmitted therethrough for a correspondingly small change in the amount of applied voltage. That is, a small change in the voltage (e.g., a change of less than 10 volts) applied to the device causes the device to switch between the transparent and translucent conditions. By "rapid" it is meant that the time required for the device to switch between the transparent and translucent states is very short (on the order of milliseconds).

It is an objective of most presently known PDLC devices to exist in only one of two extreme states (either translucent-off or transparent-on). These devices do not provide a uniform, variable optical transmission or variable grey scale. Furthermore, these PDLC devices cannot be varied and selectively adjusted from, at one extreme, a translucent off-state (corresponding to about 0% relative transmission) to, at another extreme, a transparent on-state (corresponding to about 100% relative transmission) with an infinite number of intermediate, preferably uniform, specular light transmission levels in between. This inability to provide an infinite number of intermediate light transmission levels is believed to be due, in part, to the objective that the devices switch sharply (i.e., over a small change in voltage) between the translucent and transparent conditions. Thus, the devices tend to exist only in these extreme states.

Variable grey scale PDLC devices would be useful in numerous applications. If provided in the form of thin, flexible sheets, the devices could be applied to motor vehicle sunroofs or side windows so that occupants of the motor vehicle could adjust the PDLC device to regulate the amount of specular light passed therethrough. Similarly, the devices could be applied to architectural windows, sloped glazings, skylights, interior glass partitions and the like to provide glare and/or privacy control for occupants of the building.

PDLC devices and methods for preparing them have been described both in the scientific and patent literature. For example, a device which suggests a variable grey scale is disclosed in U.S. Pat. No. 4,749,261 to McLaughlin et al. and assigned to Taliq Corporation. This patent discloses a shatterproof liquid crystal panel which comprises a pair of transparent boundary surfaces formed of glass or plastic with nematic curvilinearly aligned phase ("NCAP") liquid crystal material disposed therebetween. The NCAP liquid crystal material comprises plural volumes of an optically transparent liquid crystal formed in an optically transparent containment medium such as a polyvinyl alcohol or a latex. The volumes of liquid crystal material may be separate from one another, may be interconnected to one or more volumes, or may include both separate and interconnected volumes. The liquid crystal material may be prepared as an emulsion of liquid crystal and containment medium, the emulsion being subsequently dried (i.e., cured). Alternatively, the liquid crystal material may comprise a plurality of individually formed capsules of liquid crystal in a containment medium. The panel further includes a pair of electrodes and a variable element which can adjust the magnitude of an electric field applied to the liquid crystal material.

Reportedly, by varying the magnitude of the electric field applied across the liquid crystal material, the extent to which light is transmitted through the panel may be varied.

The NCAP liquid crystal materials of the McLaughlin et al. patent are made by an emulsion or encapsulation technique which is described more fully in U.S. Pat. No. 4,435,047 to Fergason. Emulsion or encapsulation typically involves emulsifying a liquid crystal material with an aqueous phase containing the encapsulating medium, spreading the emulsion onto a substrate, and allowing the aqueous phase to evaporate. Such systems are sensitive to moisture degradation and demand the use of relatively thick, spacer-separated substrates which can be easily coated. For example, FIG. 4 describes a liquid crystal display device which includes a substrate having a thickness of about 10 mils, (including an approximately 200 angstrom thick first electrode), a liquid crystal/encapsulating medium layer approximately 1 mil thick, and an approximately 0.5 mil thick second electrode. Because a water soluble polymer or a polymer emulsified and dispersed in water is employed, the structure presumably has limited water resistance.

The moisture sensitivity of such devices is considered in U.S. Pat. No. 4,992,201 to Pearlman which proposes, as a solution to this problem, that the liquid crystal material be dispersed in a latex medium, the latex medium being obtained by drying a suspension of natural rubbers, synthetic polymers or synthetic copolymers. The liquid crystal/latex blend may be coated onto a substrate and dried.

On the other hand, PDLC devices, such as those disclosed herein involve polymerization-induced phase separation, a technique which offers certain advantages over the emulsion or encapsulation process. Polymerization-induced phase separation is a solvent-free approach which results in the formation of structures which are less moisture-sensitive. Also, polymerization-induced phase separation allows for the production of higher molecular weight matrices which have enhanced structural properties so as to impart certain desired characteristics to the matrix.

In polymerization-induced phase separation, liquid crystal microdroplets spontaneously form in a polymer matrix upon the separation of the liquid crystal and matrix phases. Phase separation is induced by causing the uncured matrix material to polymerize. A polymerization induced-phase separation in which the uncured matrix material polymerizes upon exposure to ultraviolet (UV) radiation is particularly desirable because these systems are easily handled, do not require two-part formulations (as do epoxy-based systems), and because the phase separation kinetics can be readily controlled by adjusting the process parameters.

An early report of polymerization-induced phase separation is found in U.S. Pat. No. 3,935,337 to Taylor. More recently, U.S. Pat. No. 4,728,547 to Vaz et al. disclosed an optically responsive film comprising liquid crystals dispersed in an UV-curable polymer matrix. Liquid crystal/matrix material was applied between a pair of 20 micron ($\mu$) silica microsphere-separated glass plates and then exposed to UV radiation. UV-curable polymer matrices include those based on thiol-ene chemistry. FIG. 1 of the Vaz et al. patent suggests that within the polymer matrix, a uniform distribution of equally sized liquid crystal microdroplets is desirable. Reportedly, the liquid crystal microdroplets should be about 0.1 to 10$\mu$, preferably 0.5 to 1$\mu$ in diameter. High intensity UV radiation was used to cure the liquid crystal/matrix system (6 seconds of exposure 3 to 4 inches from a 300 Watt/inch mercury discharge lamp). The film may be used for information displays, light shutters and the like, applications for which a variable grey scale would be undesirable.

U.S. Pat. No. 4,834,509 to Gunjima et al. discloses an optical device in which liquid crystal material is uniformly dispersed in a vinyl group-containing matrix that may be polymerized with UV energy. The liquid crystal/matrix blend is disposed between a pair of electrode-bearing substrates. The patent suggests that mechanical spacers (e.g., glass, plastic or ceramic particles) may be desirably employed to carefully control the distance between the substrate electrodes thereby minimizing irregularities in light transmission due to coating thickness. The devices are useful as large area displays, light controllers and light shutters, applications for which a variable grey scale would be undesirable.

U.S. Pat. No. 4,688,900 to Doane et al. and assigned to Kent State University discloses a light modulating material comprising liquid crystal droplets dispersed in an epoxy or a polyurethane matrix. The light modulating material is disposed intermediate a pair of substrates. The matrix is cured in a phase separation process either thermally, upon exposure to UV light energy, or with a chemical promoter. Relatively thick structures in which the boundary layers (substrates) are separated by spacers and in which equally sized spherical liquid crystal droplets are uniformly dispersed in the matrix are provided.

Thermally-cured epoxy-based polymer matrices are also disclosed in U.S. Pat. Nos. 4,673,255 and 4,685,771, each to West et al. and each assigned to Kent State University. None of the aforementioned patents assigned to Kent State University is known to exhibit a uniform, selectively adjustable, variable grey scale but rather are useful in information displays, light shutters, and the like.

U.S. Pat. No. 4,944,576 to Lacker et al. discloses a PDLC device in which microdroplets of a liquid crystal material are dispersed within a photopolymerizable matrix material. The liquid crystal/matrix blend was applied between a pair of spacer-separated, electrode-coated substrates and cured with UV radiation. An electric field, a magnetic field or a mechanical stress is applied during photopolymerization to partially align the liquid crystal microdroplets. As a result of this partial alignment, the PDLC device performs similarly to known devices but with lower threshold and operating voltages. Lower threshold and operating voltages are typically associated with a sharp transition between the translucent and transparent states which is supported by the failure of FIG. 4 (graphical plots of % transmission v. 100 Hz Signal, rms volts (i.e., voltage)) to describe a variable grey scale PLDC device.

U.S. Pat. No. 4,938,568 to Margerum et al. discloses various PDLC devices comprising microdroplets of a liquid crystal material dispersed in a photopolymerizable matrix and applied between a pair of electrode-coated, spacer-separated substrates. By controlling the conditions of photopolymerization, Margerum et al. can create a variation in the size of the liquid crystal microdroplets. Reportedly, several different types of PDLC films may be obtained by spatially varying the conditions of polymerization over the film so that the sizes of the liquid crystal droplets are also spatially varied. In one approach, the exposure intensity is spatially varied by exposing the film through a mask which has a spatial variation in transmissivity. The mask may be at least partially transmissive over its entire area, thereby enabling substantially the entire film to polymerize at about the same time, but at spatially varying polymerization rates corresponding to the spatial variation in mask transmissivity. Alternatively, polymerization may take place in a two-step process by an exposure with the mask in one step, and an exposure without the mask at a different exposure intensity in another step. This technique is based on the observation by Margerum et al. that liquid crystal droplet size may be reduced by increasing the intensity of the UV radiation.

A representative structure is shown in FIG. 3 which illustrates alternating bands of "large" and "small" liquid crystal droplets which repeat from one edge of the PDLC film to the opposite edge. An alternative structure is shown in FIG. 5 which schematically illustrates a variation in liquid crystal droplet size through a PDLC film from one major planar surface to the other. The resulting PDLC devices have reduced operating voltages relative to those previously known. A reduction in operating voltage is typically associated with a sharp transition between the transparent on-state and the translucent off-state. Consequently, this patent does not disclose a PDLC device which exhibits a variable grey scale.

U.S. Pat. No. 4,411,495 to Beni et al discloses a refractive index switchable display cell, the opacity of which may be varied by changing the amplitude of an electric field applied across the device. The cell comprises a preformed, commercial porous filter imbibed with a liquid crystal material. (A similar device is disclosed in "New display based on electrically induced index matching in an inhomogeneous medium") *Appl. Phys. Lett.* 40(1), Jan. 1, 1982 (pp. 22–24) by H. G. Craighead et al. The preformed filter serves as a spacer and the device is described as "providing a gray scale.")

Interest in PDLC devices has spawned a spate of technical and academic articles. For example, "Response Times and Voltages for PDLC Light Shutters," *Liquid Crystals,* 1989, Vol. 5, No. 5, pp. 1453–65 by B.-G. Wu et al. notes that the type of polymer matrix can dramatically influence the switching voltage (the applied voltage differential required to transition the PDLC device between the translucent off-state and the transparent on-state). A PDLC device employing a poly(methyl methacrylate) matrix may have a switching voltage of about 200 volts (V), while an identical device reportedly having the same droplet size and shape but using an epoxy matrix may have a switching voltage of 20 V. These observations were based on a system using a liquid crystal material and poly(methyl methacrylate) in a 1:2 ratio by weight. The mixture was applied between a pair of spacer-separated, electrode-coated substrates.

"Droplet Size Control in Polymer Dispersed Liquid Crystal Films," SPIE, Vol. 1080, *Liquid Crystal Chemistry, Physics and Applications* (1989), pp. 53–61 by A. M. Lackner et al. teaches the formation of PDLC devices comprising liquid crystal droplets dispersed in an UV-curable thiol-ene matrix, the liquid crystal/matrix system being applied between a pair of spacer-separated, electrode-coated substrates. Liquid crystal droplet size was reduced by increasing the intensity of the UV radiation. At an intensity of approximately 13 milliwatts/sq. cm (mW/cm$^2$), a droplet diameter of about 1.0$\mu$ was achieved. The PDLC devices are not reported as exhibiting a variable grey scale.

"A Light Control Film Composed of Liquid Crystal Droplets Dispersed in an UV-Curable Polymer," *Liquid Crystal,* 1987, Vol. 146, pp. 1–15 by N. A. Vaz et al. discloses a PDLC device comprising submicron size liquid crystal droplets uniformly dispersed in an UV-curable matrix. The photomicrograph of FIG. 1 appears to show liquid crystal droplets of substantially equal size. The liquid crystal/uncured matrix material is disposed between a pair of spacer-separated, electrode-coated substrates and cured by exposure to UV radiation of 85 mW/cm$^2$ intensity (50% uncertainty). PDLC film thickness was typically 27 to 30$\mu$. The devices are useful for displays and light shutters but do not otherwise exhibit a variable grey scale. The discussion on pages 6 and 7 of the article suggests that the performance of the device illustrated in FIG. 2 has not been optimized and that it would be desirable to have a sharper transition (i.e., the transition between the translucent off-state and the transparent on-state should occur over a smaller voltage range).

"Morphological control in polymer-dispersed liquid crystal film matrices" by F. G. Yamagishi et al., SPIE Vol. 1080, *Liquid Crystal Chemistry, Physics and Applications* (1989), pp. 24–28 discloses the preparation of a PDLC device comprising liquid crystal droplets dispersed in a polymerizable matrix. The liquid crystal/uncured matrix blend was applied between a pair of electrode-coated, spacer-separated substrates and cured using UV radiation in the range of 60 mW/cm$^2$. Some of the devices obtained by Yamagishi et al. displayed a "polymer ball" morphology in which domains of a polymeric material are understood to be dispersed in a continuous liquid crystal phase. There is no indication that any of the resulting devices which comprise liquid crystal droplets dispersed in a polymer matrix exhibit a variable grey scale.

It is desirable in certain applications to have PDLC devices which display a variable grey scale. Presently known PDLC devices which suggest the possible objective of a variable grey scale employ emulsion/encapsulation formation techniques; however, these techniques suffer from certain undesirable limitations. The formation of PDLC devices using phase separation and an UV-polymerizable matrix is advantageous. However, presently known PDLC devices which make use of such techniques do not exhibit a variable grey scale. Consequently, there is a need for a PDLC device which exhibits a variable grey scale and which employs an UV-polymerizable matrix.

Moreover, in the presently known methods for producing PDLC devices based on an UV-polymerizable matrix material, the matrix material is typically cured (polymerized) by exposing the uncured matrix material to relatively high intensity UV radiation sources, for example, medium or high pressure mercury or mercury/xenon lamps. Such radiation sources can become quite hot during operation, necessitating the use of elaborate and expensive cooling and temperature control systems. Such radiation sources have also been associated with certain maintenance problems. Accordingly, it would be desirable if PDLC devices could be produced in a method which utilizes relatively low intensity UV radiation to cure the uncured polymer matrix material.

SUMMARY OF THE INVENTION

The invention relates to a polymer-dispersed liquid crystal device which comprises a multiplicity of droplets of a birefringent, functionally nematic liquid crystal material dispersed in a matrix which comprises the reaction product of ultraviolet radiation polymerizable materials. The device specularly transmits incident light as a function of the magnitude of an electric field applied across the device and has a delta V ("$\Delta V$") greater than or equal to 15 volts (V). $\Delta V$ may be calculated according to the following equations:

$$\Delta V = (V_{80+0}) - (V_{20+0}),$$

wherein $V_{80+0}$ is a first applied voltage corresponding to a first percentage of the total incident light transmitted by the device as specular light, and $V_{20+0}$ is a second applied voltage corresponding to a second percentage of the total incident light transmitted by the device as specular light.

The "first percentage of the total incident light transmitted by the device as specular light" ($\Delta\% \, T_{80+0}$) is equal to the sum of (a) the percentage of the total incident light transmitted by the device as specular light at 0 applied volts (% $T_0$) and (b) 80% of the difference between (i) the percentage of the total incident light transmitted by the device as specular light at 100 applied volts (% $T_{100}$) and (ii) % $T_0$.

The "second percentage of the total incident light transmitted by the device as specular light" ($\Delta\% \, T_{20+0}$) is equal to the sum of (a) % $T_0$ and (b) 20% of the difference between % $T_{100}$ and % $T_0$.

Preferably $\Delta V$ is at least 20 V, more preferably in the range of 20 to 30 V.

Application of an electric field across the device causes the device to switch between a relatively translucent state (corresponding to about 0% relative transmission) and a relatively transparent state (corresponding to about 100% relative transmission). By varying the magnitude of the electric field, the device can be selectively adjusted to transmit, preferably uniformly, any desired amount of specular light between 0% and 100%. Thus, devices formed according to the invention exhibit a selectively adjustable and, preferably, uniform grey scale.

Liquid crystal materials useful in forming the droplets include birefringent materials having at least one nematic mesophase, for example, birefringent chiral nematic and birefringent nematic type, although any liquid crystal material which is suitably birefringent may be used. A liquid crystal material is suitably birefringent if the difference between the ordinary and extraordinary indices of refraction (i.e., the optical anisotropy) is in the range of about 0.01 to 0.5.

Polymeric matrices in which the liquid crystal droplets may be dispersed preferably comprise reaction products of materials such as monomers, oligomers or reactive polymers which may be polymerized by photoinitiation. Suitable polymer matrix materials include monofunctional and/or multifunctional (meth)acrylates; allyl or (meth)acrylated oligomers of polyurethanes, polyesters, polyols, polybutadienes, or epoxies; and thiol-enes. Several photoinitiation systems for curing the uncured matrix material are also known.

Formation of a device according to the invention is typically carried out in a polymerization-induced phase separation process. The liquid crystal material and the uncured polymer matrix material are preferably combined in a ratio of 40:60 to 60:40 (parts by weight) respectively. The liquid crystal/polymer matrix exists as a film which preferably has a thickness in the range 5 to 25 microns ($\mu$), more preferably 10 to 25$\mu$, and most preferably 15 to 21$\mu$, so as to ensure that the device can be fully switched at an applied voltage of 120 V or less.

To facilitate the application of an electric field across the device, the device may further comprise a pair of electrodes (at least one of which is partially transparent) adjacent to the device, the electrodes being connected to a variable power supply. The electrodes may be provided in the form of an at least partially transparent metal or metal alloy (e.g. tin, gold, silver, indium oxide, indium tin oxide as well as other transition metals or transition metal oxides) that can be coated onto a substrate such as glass or a plastic.

Devices according to the invention are useful in conjunction with, for example, motor vehicle sunroofs or architectural windows. The vehicle or building occupants may selectively adjust the amount of specular light transmitted through the device so as to satisfy their particular desires, such as reducing the amount of glare.

The invention also relates to a process for preparing a PDLC material. The process includes the steps of:

(a) providing a solution comprising one or more birefringent, functionally nematic liquid crystal materials with one or more ultraviolet radiation polymerizable materials; and (b) exposing the solution to ultraviolet radiation having an intensity of less than about 10 mW/cm$^2$ (preferably less than about 5 mW/cm$^2$) and a continuous emission spectrum for a time and at a temperature whereby the ultraviolet radiation polymerizable material polymerizes to form a matrix and droplets of the liquid crystal material are dispersed in the matrix.

Preferably the radiation source is a fluorescent lamp. It may also be useful to control the temperature of the solution prior to and during polymerization to prevent premature temperature-induced phase separation of the liquid crystal and radiation polymerizable materials. The UV radiation exposure may be carried out in two stages such that the liquid crystal material at least partially phase separates from the ultraviolet radiation polymerizable material in the first stage and formation of the PDLC material is completed in the second stage as the matrix fully cures. The intensity of the UV radiation in the second stage may be greater than that used in the first stage.

Preferably the resulting PDLC material has a microstructure which permits a device formed therewith to have a $\Delta V$ of greater than or equal to 15 V.

The inclusion of a filler such as finely divided silica may enhance the formation of a PDLC material.

BRIEF DESCRIPTION OF THE DRAWINGS

The invention will be more fully understood with reference to the following drawings in which.

DETAILED DESCRIPTION OF THE PREFERRED EMBODIMENTS

This invention relates to both a polymer dispersed liquid crystal ("PDLC") device which displays a variable grey scale and to a method for making PDLC devices in general. By "variable grey scale" it is meant that the amount of specular light which is passed or transmitted through the device can be selectively and, preferably, uniformly adjusted to satisfy the demands of particular users. In addition to a translucent off-state (corresponding to about 0% relative light transmission) and a transparent on-state (corresponding to about 100% relative light transmission), a user of the device can selectively adjust the same so that it transmits any desired amount of specular light. As explained more fully hereinbelow, the degree of light scattering through the device may be adjusted by varying the magnitude of an electric field applied across the device.

Light which is incident upon the device is either transmitted through the device, absorbed by the device or reflected by the device. Light which is transmitted by the device is either scattered or not. "Specular light" refers to unscattered, transmitted light. More particularly, specular light refers to light which is transmitted through the device and which is scattered (relative to the angle at which the light was incident upon the device) at an angle which deviates from the angle of incidence by no more than 4°, preferably no more than 2.5°.

Figure 1:
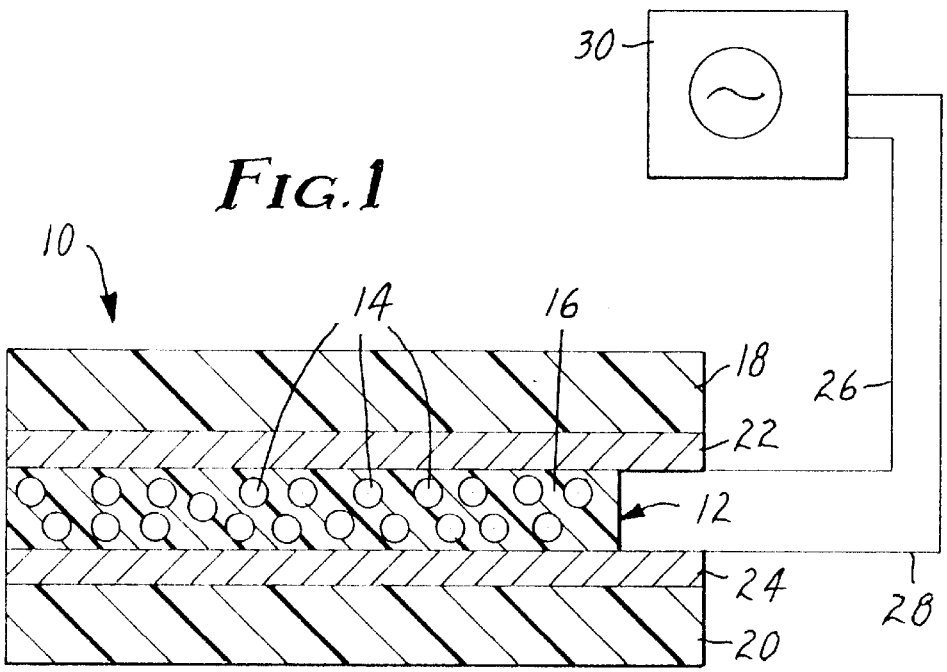
FIG. 1 is a schematic view, partially in cross-section, of a PDLC device according to the invention.

Turning now to the drawings, and in particular to FIG. 1, a variable grey-scale PDLC device 10 according to the invention is shown. In one embodiment, the device 10 comprises a PDLC film 12 having a multiplicity of liquid crystal droplets 14 dispersed in a polymeric matrix 16.

Liquid crystal materials useful in forming the droplets 14 are functionally nematic and suitably birefringent. Typically they have at least one nematic mesophase and display positive dielectric anisotropy and/or positive diamagnetic anisotropy in the polymer matrix 16. By "functionally nematic" it is meant that the liquid crystal material is conventionally considered to be "nematic" (e.g., birefringent nematic type, birefringent chiral nematic type, as well as mixtures thereof) or, if not considered "nematic" in the conventional sense, has the capacity to function as a nematic material (e.g., cholesteric types and mixtures thereof).

Whether a liquid crystal material is "suitably birefringent" may be determined with reference to its optical anisotropy ($\Delta n$). Liquid crystal materials useful in the invention are biaxially birefringent and have essentially rod-shaped molecules. The major axis of a liquid crystal molecule is regarded as its optic axis. A body of liquid crystal molecules in the nematic mesophase displays an ordinary index of refraction ($n_o$) perpendicular to the optic axes of the molecules and an extraordinary index of refraction ($n_e$) parallel to the optic axes. The difference between the values of $n_e$ and $n_o$ (the optical anisotropy or $\Delta n$) describes the birefringence of the liquid crystal material. Typically preferred values for $\Delta n$ for liquid crystal materials useful in the invention are in the range of 0.01 to 0.5. Furthermore, $n_o$ should be closely matched to the index of refraction of the polymer matrix material (e.g., ±0.02, preferably, ±0.002) so as to enhance the transparency of the PDLC device in the on-state. The polymer matrix material should be optically isotropic so as to minimize undesirable birefringence effects of the liquid crystal material.

Commercially available liquid crystal materials useful in the invention include LICRISTAL E7, BL006, BL009, ML1005, ML1008, 17151, 17153, 17315, 17722 (sometimes available under the trade designation BL038) and 17723 (sometimes available under the trade designation BL036) (all available from EM Industries, Hawthorne, N.Y.). Mixtures of these liquid crystal materials may also be used.

Polymeric matrix materials 16 in which the liquid crystal droplets may be dispersed preferably comprise reaction products of materials such as monomers, oligomers or reactive polymers which may be polymerized by photoinitiation. Several photoinitiation systems involving different chemistries are known and may be used in the invention to cure the uncured matrix material.

Suitable techniques for providing polymer matrix 16 include radical polymerization of monofunctional and/or multifunctional alkyl acrylates and methacrylates. Useful monofunctional acrylate monomers include, for example, unsaturated acrylate esters of non-tertiary alkyl alcohols, the molecules of which have from 1 to about 14 carbon atoms. Included within this class of monomers are, for example, isooctyl acrylate, isononyl acrylate, 2-ethyl-hexyl acrylate, decyl acrylate, dodecyl acrylate, n-butyl acrylate, and hexyl acrylate. The alkyl acrylate monomers may be used to form homopolymers, copolymers or higher order polymers for the polymer matrix material or they may be copolymerized with polar monomers.

The polar copolymerizable monomers may be selected from monomers such as acrylic acid, itaconic acid, hydroxyalkyl acrylates, cyanoalkyl acrylates, acrylamides or substituted acrylamides, N-vinyl pyrrolidone, N-vinyl caprolactam, acrylonitrile, vinyl chloride or diallyl phthalate.

Non-polar monomers such as isobornyl acrylate, dicyclopentadiene acrylate, etc. are also suitable for use in the invention.

Multifunctional acrylates include 1,6 hexanadioldiacrylate, trimethylpropane triacrylate, propylene glycol dimethacrylate etc. can be used as major components of the matrix or alternatively may be incorporated at lower levels (e.g. 0.05 to 2 parts by weight of the total monomer content) to function as crosslinkers.

Also useful in the invention are reactive oligomers, such as allyl or (meth)acrylated oligomers of polyurethanes, polyesters, polyols, polybutadienes or epoxies. An example of a suitable acrylated polybutadiene is SARTOMER CD 5000 (commercially available from Sartomer Co.). A useful acrylated polyester is SARTOMER 609 (from Sartomer Co.) and a suitable acrylated polyurethane is SARTOMER 9610 (Sartomer Co.).

Blends of the reactive oligomers and the alkyl ester monomers described above may be used. Blends may be useful in adjusting certain properties such as the refractive index of the polymer matrix material, the solubility of the liquid crystal material in the polymer matrix material, or the viscosity of the liquid crystal/polymer matrix system. The ratio of oligomer to monomer will depend on the physical properties of the oligomer and may vary from neat monomer to neat oligomer. At the temperature at which the mixture is to be applied to a substrate (if a substrate is employed) (typically a temperature in the range from about 60° to 120° F. (about 16° to 49° C.)), the mixture should have a viscosity which renders it coatable and the liquid crystal material should remain soluble therein.

Where photopolymerization is desirable, the polymer matrix material may also contain a photoinitiator to aid in polymerization of the monomers. Photoinitiators that are useful for polymerizing the acrylate monomer include the benzoin ethers, substituted benzoin ethers such as benzoin methyl ether or benzoin isopropyl ether, substituted acetophenones such as 2,2-diethoxy-acetophenone, and 2,2-dimethoxy-2-phenyl-acetophenone, substituted alpha-ketols such as 2-methyl-2-hydroxypropiophenone, aromatic sulphonyl chlorides such as 2-naphthalene sulphonyl chloride, and photoactive oximes such as 1-phenyl-1,1-propanedione-2-(O-ethoxycarbonyl)oxime. Generally, the amount of photoinitator is from about 0.01 part to about 10 parts per 100 parts monomer weight.

Other radical polymerization initiating systems which may be used include 3,4-bistrichloro-methyl-6-substituted-s-triazines, and benzophenone with an amine, for example, benzophenone and p-(N,N-diethylamino)ethyl benzonate.

Reactants useful for the polymeric matrix material also include UV polymerizable systems based on thiol-ene chemistry. An example of such a system is based on the reaction products of triallyl isocyanurate and/or other suitable mono-, di- and triallyl ethers or esters, and one or more suitable polythiol oligomers selected from the group consisting of $Z[OCO(CH_2)_nSH]_m$, wherein Z=a polyvalent organic moiety which is a $CH_{0-3}$ group-containing nucleus of a tri- or tetravalent alcohol such as glycerol, trimethylolpropane or pentaerythritol;

m=3 or 4; and n=1 to 5.

Other useful UV polymerizable systems based on thiol-ene chemistry comprise, in major part, monofunctional or multifunctional allyl compounds containing an hydroxyl group reacted with a mono- or multifunctional isocyanate, which reaction product is subsequently reacted with one or more suitable polythiol oligomers having the structure described above. This UV polymerizable system may include other allyl functional monomers. For example, the system may optionally include as a third material, a mono-, di-, or triallyl compound which reacts with the polythiol.

The polymer matrix material may also comprise a blend of monofunctional (meth)acrylates, and/or multifunctional (meth)acrylates, and the polythiol oligomers described above.

The proportions of the various allyl and/or (meth)acrylate compounds noted above in the several different systems and the polythiol are selected so as to produce a relatively high molecular weight polymer. Preferably the stoichiometric ratio of polythiol to allyl and/or meth(acrylate) compound is in the range of about 1.5 to 2.5, more preferably, about 2.

Examples of useful polymer matrices based on thiol-ene chemistry include NOA 65 and NOA 68 (each commercially available from Norland Products, Inc. New Brunswick, N.J.) which include photoinitiators.

The liquid crystal material may also be dispersed in a polymer matrix formed by the polymerization of a functional epoxy monomer or oligomer, and a polyol. These systems can be photoinitiated by diaryl iodium or triaryl sulfonium salts such as triphenyl sulfonium hexafluoroantimonate. Alternatively, photoactive organometallic compounds known to catalyze epoxy polymerization may be used, such as those disclosed in European patent publication no. 109,851.

Representative epoxy substituted compounds which are useful as matrix precursors are discussed in *U.V. Curing: Science and Technology* (S. P. Pappas, editor), published by Technology Marketing Corporation, 1978, p. 45, which page is hereby incorporated by reference. A suitable epoxy resin mixture is, for example, a blend of EPON 828 (commercially available from Shell Chemical Co.) and trimethylene glycol, in a ratio of about 4:1 parts by weight and about 0.5 part (based on total epoxy content) of an UV energy activated curative such as FC-508 (commercially available from Minnesota Mining and Manufacturing Co.).

Various other monomers may be incorporated into the polymer materials described hereinabove to usefully adjust the physical characteristics thereof. For example, other monomers may be included to adjust the refractive index of the polymer matrix material relative to the refractive index of the liquid crystal material.

The polymer matrix material should be selected such that the liquid crystal material is soluble in the photopolymerizable mixture, although an application of heat may be necessary to achieve this. Upon polymerization of the mixture, the liquid crystal material should become insoluble in the polymer matrix and form droplets.

Formation of a PDLC film according to the invention is typically carried out in a phase separation process. Polymerization induced-phase separation has been found to be useful when the uncured polymer matrix material is miscible with a low molecular weight liquid crystal material. Liquid crystal droplets form when the solubility of the liquid crystal material in the polymer matrix material decreases as a result of an increase in the molecular weight of the matrix material which occurs when the matrix material polymerizes to form a continuous phase. As the solubility of the liquid crystal material decreases, it phase separates from the polymer matrix material and forms droplets. The droplets increase in size until the polymer matrix material locks in the final droplet morphology. The liquid crystal droplets should be present in a range of sizes (diameters) extending from about 0.1 to about 10 microns ($\mu$), preferably about 0.8 to 5$\mu$, and more preferably about 1 to 3$\mu$. The polymerization is carried out in the presence of the liquid crystal material thereby enabling tailoring of the polymer matrix material in terms of molecular weight, crosslink density, liquid crystal compatibility, and adhesion.

Polymerization as described above involves the phase separation of the liquid crystal material from the polymer matrix material (upon curing or polymerization of the matrix material). Therefore, any premature phase separation should be prevented. "Premature phase separation" refers to an unwanted, thermally-induced phase separation that occurs before the "desired" phase separation (which results from a decrease in the solubility of the liquid crystal material as explained above). Premature phase separation can be reduced by heating the liquid crystal and uncured polymer matrix materials to form a homogeneous solution and further by continuing to apply heat prior to and during curing. With the appropriate selection of the liquid crystal and polymer matrix materials, it is believed that control of premature phase separation by temperature regulation results in the production of PDLC devices having larger numbers of smaller diameter liquid crystal droplets than is otherwise achievable.

Phase separation of the liquid crystal material upon polymerization of the uncured polymer matrix material to form a dispersion of droplets in the matrix material may be enhanced by the addition of a filler such as finely divided silica having a B.E.T. surface area of at least 10 $m^2/g$ (preferably 50 to 400 $m^2/g$) to the polymerizable matrix material prior to the addition of the liquid crystal material. Fumed or precipitated silica of either the hydrophobic or hydrophilic type may be used. It is believed that the presence of the silica changes the solubility of the liquid crystal material in the uncured polymer matrix material thereby desirably altering the dynamics of phase separation. The amount of silica will vary depending on the particular liquid crystal and polymer matrix materials. Generally about 0.1 to 5 (preferably 0.5 to 2) weight percent silica based on the weight of the polymer matrix material is effective. An example of a commercially available hydrophobic fumed silica which is useful in the invention is AEROSIL R 972 (available from Degussa Corp.). An example of a commercially available hydrophilic fumed silica is CAB-O-SIL M-5 (available from Cabot Corp.; Cab-O-Sil Division, Tuscola, Ill.).

Although an application of heat is useful in preventing premature phase separation, heating the system too much may adversely affect the phase separation which should occur upon curing of the polymer matrix material and may result in the inability to create well-formed liquid crystal droplets. The appropriate temperature range is a function of the liquid crystal and polymer matrix materials.

Preferably, the liquid crystal material and the polymer matrix material are provided in approximately equal parts by weight although the parts by weight ratio of the liquid crystal material to the polymer matrix material can vary from 40:60 to 60:40. If the liquid crystal material comprises less than about 40 parts by weight or more than about 60 parts by weight, then one or more of the following may be materially adversely affected: switching performance, adhesion, environmental stability and cost.

Referring again to FIG. 1, although the PDLC film 12 may be provided in free-standing form, in many applications it will be desirable to provide a sandwichlike construction in which the PDLC film 12 is interposed between a pair of first and second substrates 18 and 20, respectively. It will be understood that the device 10 may be provided with only a single substrate if, for example, the device is to be applied to a motor vehicle sunroof or an architectural window in which case the sunroof or the window have a function analogous to that of the second substrate.

Preferably, at least one of the substrates 18 and 20 is at least partially transparent to allow incident visible light to pass therethrough. One of the substrates (preferably the one on which light first impinges) may be modified to have selective light transmission characteristics, for example, to selectively transmit light of a wavelength corresponding to a certain color of the visible spectrum, ultraviolet light or infrared light. Materials suitable for the substrates 18 and 20 include glass (which may be tempered) and plastics such as polyester (or a copolyester), polyethersulfone, polyimide, polyethylene terephthalate, polyethylene naphthalate, poly (methyl methacrylate), and polycarbonate. The substrates may be treated so as to enhance their abrasion and scratch resistance. The substrates are typically about 25 to 50$\mu$ thick for flexible, durable constructions, although they may range in thickness from 1$\mu$ to greater than 250$\mu$. If glass is employed for at least one of the substrates, a thickness in excess of 250$\mu$ may be useful.

With continued reference to FIG. 1, in order to induce a change in the orientation of the liquid crystal droplets so as to cause the PDLC film 12 to switch between the translucent off-state and the transparent on-state, it is necessary to apply an electric field across the film 12. (The PDLC film 12 may also be switched by applying a magnetic field or a thermal stress across the same.) Accordingly, the device 10 may further comprise first and second electrodes 22 and 24, respectively, which are positioned intermediate the substrates 18 and 20 and the PDLC film 12. The electrodes 22 and 24 are connected to, respectively, first and second leads 26 and 28 (for example, a conductive adhesive tape or the like) which, in turn, are electrically connected to a variable power supply 30, preferably of the alternating current type. Preferably, the frequency of the alternating field should be in the range of 40 to 100 hertz. The field should alternate sufficiently rapidly so that a human observer of the device cannot perceive flickering. Thus, upon application of an electric field across the PDLC film 12, the optic axes of the liquid crystal droplets become aligned. If the refractive indices of the liquid crystal material and the polymer matrix material have been closely matched, the film 12 will switch between the translucent off-state and the transparent on-state.

The electrodes 22 and 24 may be formed of various materials including chromium, indium oxide, tin oxide, stainless steel, indium tin oxide, gold, silver, copper, aluminum, titanium, cadmium stanate, other transition metal oxides, and mixtures and alloys thereof. With the use of certain electrode materials (e.g. silver) it may be desirable to environmentally protect the same with a thin, passivating dielectric layer. The use of such a protective layer may enhance the ability of the electrode to resist thermal, chemical, moisture and/or ultraviolet-induced degradation such as is disclosed in the aforementioned concurrently filed U.S. patent application to Gilbert et al., which application was incorporated by reference. The electrodes must be capable of receiving an electrical input from the leads 26 and 28 and transmitting the same so as to apply an electric field across the film 12. Preferably the electrodes 22 and 24 are positioned adjacent to opposite sides or surfaces of the film 12 and extend over, across and parallel to the same.

At least one of the electrodes 22 and 24 preferably comprises a conductive coating that is at least partially transparent to visible light, although electrodes which provide preferential light transmission characteristics, such as color tint or ultraviolet or infrared filter, may be used. The electrodes 22 and 24 need not be equally transparent. At least one of the electrodes should provide a visible light transmission of at least 1%, preferably at least 10%, and more preferably at least 50%. The electrode coating should have a conductivity greater than 0.001 mhos per square. The electrode material may be coated or otherwise applied to the first and second substrates 18 and 20.

Maximum light transmission through the device is determined by selection of material used for the electrode and the thickness of the coating. Typically, maximum light transmission ranges from about 30% to about 80%.

In operation, a user of the device 10 manipulates and selectively adjusts the variable power supply 30 to vary the magnitude of the electric field applied across the film 12 until the device 10 transmits the desired amount of specular light, the amount which is desired being dependent on the particular situation.

The thickness of the PDLC film 12 influences at least in part its optical characteristics. Preferably, the film has a thickness in the range of about 5 to 25$\mu$, more preferably in the range of about 10 to 25$\mu$, and most preferably in the range of about 15 to 21$\mu$. If the film thickness exceeds about 25$\mu$, the initial voltage at which the device 10 begins to switch may be too high for effective use in relatively low voltage environments (for example, an automobile) or the device may require increased amounts of power to switch between the translucent off-state and the transparent on-state. The maximum voltage required to fully switch the film should be less than 120 volts (V), preferably less than 100 V, and most preferably between about 40 to 60 V. (All voltages referenced herein are reported as root mean square (RMS) values.)

On the other hand, if the PDLC film thickness is less than about 10$\mu$, the device 10 may appear transparent even in the off-state (i.e., without any voltage being applied). This might be desirable in applications where it is necessary to adjust the degree to which specular light is transmitted through the device when the device is in the off-state such as for jurisdictions having motor vehicle or building codes with minimum visibility standards. Devices in which the PDLC film thickness is about 5 to 10$\mu$ may also be useful in constructions where one of the electrodes is fully reflective and the PDLC film functions as an anti-reflection layer that can be transitioned between the translucent and transparent states at a relatively low applied voltage. An example of such a device is a membrane switch bearing a reflective pad in a contrasting color relative to the switch background and in which the pad repeatedly cycles between the translucent and transparent states when touched so as to change visibility in low light environments.

The desired thickness of the PDLC film is also related to the difference between the ordinary ($n_o$) and extraordinary ($n_e$) indices of refraction of the liquid crystal material. If the difference is in the range of about 0.22 to about 0.26, a PDLC film thickness in the range of 15 to $21\mu$ is preferred. If the index of refraction difference is less than 0.22, then the film may need to have a thickness greater than $21\mu$. Alternatively, if the index of refraction difference is greater than 0.26, then the film may be comprised of a thickness less than $15\mu$. (The relationships between the index of refraction and the PDLC film thickness assume a constant droplet structure.) Whether a particular device exhibits a variable grey scale within the scope of the invention may be determined with reference to a graphical plot of the percentage of total light incident on the device which is transmitted unscattered therethrough (i.e., specular light) (referred to herein at times as "% transmission" or "% T") as a function of the voltage which is applied across the PDLC film. More particularly, whether a device exhibits a variable grey scale may be determined with reference to the voltage differential required to change the transmissivity of the device from a first value to a second value.

Whether a PDLC device exhibits a variable grey scale is determined as follows:

The % transmission of the device is measured at 0 applied volts (referred to herein at times as "% $T_0$") and 100 applied volts (referred to herein at times as "% $T_{100}$"). The % transmission at 100 V was selected for measurement since, for many devices, a graphical plot of % T vs. applied voltage shows a slope of about 0 at that portion of the plot. For those devices in which the % T has not reached a plateau (i.e., the slope is not zero), 100 V provides a convenient reference point. The difference between % $T_{100}$ and % $T_0$ is calculated, this difference sometimes being referred herein to as "$\Delta\% T$" or "the total change in % transmission" ("the total change in % T"). 80% of $\Delta\% T$ and 20% of $\Delta\% T$ (sometimes referred to herein as, respectively, "$\Delta\% T_{80}$" and "$\Delta T \%_{20}$" are then calculated. The % T at 0 applied volts (% $T_0$) is then added to each of $\Delta\% T_{80}$ and $\Delta\% T_{20}$, the two sums sometimes being referred to herein as, respectively, "$\Delta\% T_{80+0}$" and "$\Delta\% T_{20+0}$." The applied voltages corresponding to $\Delta\% T_{80+0}$ and $\Delta\% T_{20+0}$ are then determined, these values sometime being referred to herein as, respectively, $V_{80+0}$ and $V_{20+0}$. The voltage differential between $V_{80+0}$ and $V_{20+0}$ (referred to herein at times as $\Delta V$) is then calculated.

A variable grey scale is found when $\Delta V$ is greater than or equal to 15 V, more preferably greater than or equal to 20 V, and most preferably in the range of 20 to 30 V. Device performance may be negatively materially affected if $\Delta V$ is greater than about 60 V.

Figure 2:
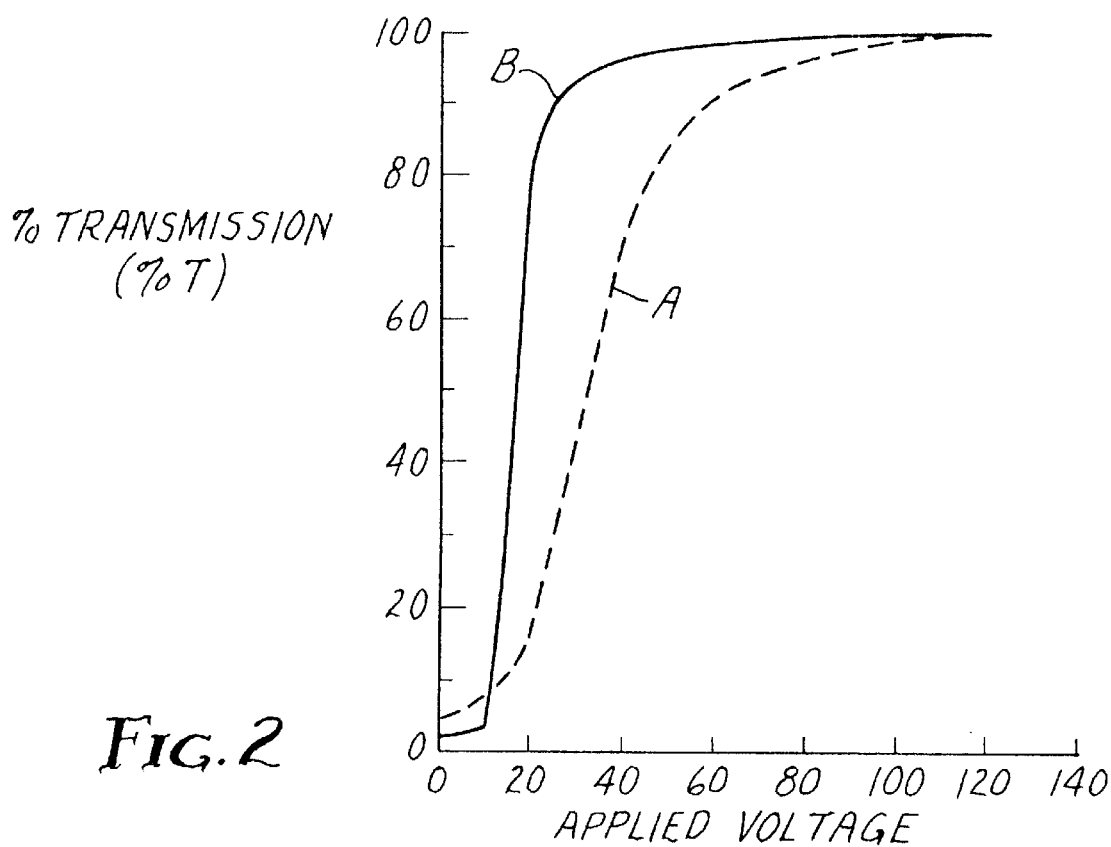
FIG. 2 is a graphical plot of % transmission v. applied voltage for a PDLC device according to the invention and for a presently known PDLC device.

In FIG. 2, a graphical plot of % T as a function of applied voltage, the performance of a PDLC device according to the invention is shown as the curve labeled with the reference letter A. This particular device has a % $T_0$ of about 3% (i.e., a 3% transmission at 0 applied volts corresponding to the translucent off-state) and a % $T_{100}$ of about 97% (i.e, a 97% transmission at 100 applied volts corresponding to the transparent on-state). The $\Delta\% T$ (% $T_{100}$-% $T_0$) of the "curve A" device is about 94% (i.e., 97%–3%). 80% of $\Delta\% T$ (i.e, $\Delta\% T_{80}$) is 75.2% and 20% of $\Delta\% T$ (i.e, $\Delta\% T_{20}$) is 18.8% thereby yielding $\Delta\% T_{80+0}$=78.2% (75.2%+3%) and $\Delta\% T_{20+0}$=21.8% (18.8%+3%). The applied voltage corresponding to $\Delta\% T_{80+0}$ (i.e, 78.2%) is 44 V ($V_{80+0}$) and the applied voltage corresponding to $\Delta\% T_{20+0}$ (i.e., 21.8%) is 22 V ($V_{20+0}$). The difference between the two applied voltages (i.e, $\Delta V$) is 22 V (44 V–22 V).

The performance of a presently known device is also illustrated in FIG. 2 as the curve labeled with the reference letter B. (The data used to prepare curves A and B in FIG. 2 were normalized so that the performance of the two devices could be fairly compared on the same graph. Data normalization is a frequently used analytical technique and is well understood by those skilled in the art. In order to simplify the calculations necessary to derive $\Delta V$, it is preferred that the data be normalized to yield a maximum transmission (i.e, a % T of 100%) at 100 V. In the preparation of FIG. 2, however, the data were normalized to yield a maximum transmission at 120 V. This did not alter the validity of the data interpretation since the performances of both devices were normalized in the same manner.)

The presently known device is manufactured by and commercially available from Ajinomoto Co., Inc., Tokyo Japan. Using the same method of calculation as described above, the $\Delta V$ of the Ajinomoto device is about 8 volts. A $\Delta V$ of less than 15 V is desired in applications where sharp switching (such as for display arrangements or multiplexing) is important. In these devices, it is desirable to minimize both $\Delta V$ and the threshold voltage (i.e, the minimum applied voltage at which the device begins to switch between the translucent and transparent states). By minimizing both $\Delta V$ and the threshold voltage, the power needed to operate the device is reduced because it begins to switch at a lower voltage and because it switches more sharply (i.e., it switches over a smaller voltage range or $\Delta V$). The cost of the drive circuitry is also a major factor in the overall performance of the display device. By achieving a saturation voltage (i.e., the voltage required to achieve a maximum % transmission) of 28 V or less, the cost of the drive electronics interfacing with the device can be significantly reduced. A saturation voltage of 15 V or less is preferred. Such considerations are important where it is desirable to have sequential addressing of certain areas (e.g., pixels in a display device).

In addition to a voltage differential of at least 15 V, variable grey scale devices preferably exhibit a uniform appearance as the voltage is varied between the threshold voltage (corresponding to the translucent off-state) and the maximum voltage (corresponding to the transparent on-state). That is, the relative translucent/transparent appearance should be substantially uniform across the entire PDLC device. A PDLC device according to the invention will display a uniform appearance if it has a $\Delta V$ of at least 15 V. In those PDLC devices which are presently known and which do not display a variable grey scale, the transition between the translucent and transparent states is uneven and non-uniform. These devices tend to have a blotchy appearance while transitioning.

As explained more fully below, it is believed that the ability to achieve a variable grey scale device having a uniform appearance during transition is also related to the structure of the liquid crystal droplets. That is, a range or variation in the size or diameter of the liquid crystal droplets positively contributes to the provision of a PDLC device which uniformly transitions between the translucent and transparent conditions. Other characteristics of PDLC devices are also related to the attainment of a device which has a uniform translucent/transparent appearance. For example, the PLDC device comprising liquid crystal droplets dispersed in a polymer matrix material should be of substantially equal thickness. While this condition is necessary to achieving a uniform appearance, it is not sufficient. Presently known devices contain mechanical spacers to maintain constant PDLC film thickness but tend to exhibit a blotchy appearance while transitioning between the translucent and transparent states.

Figure 3:
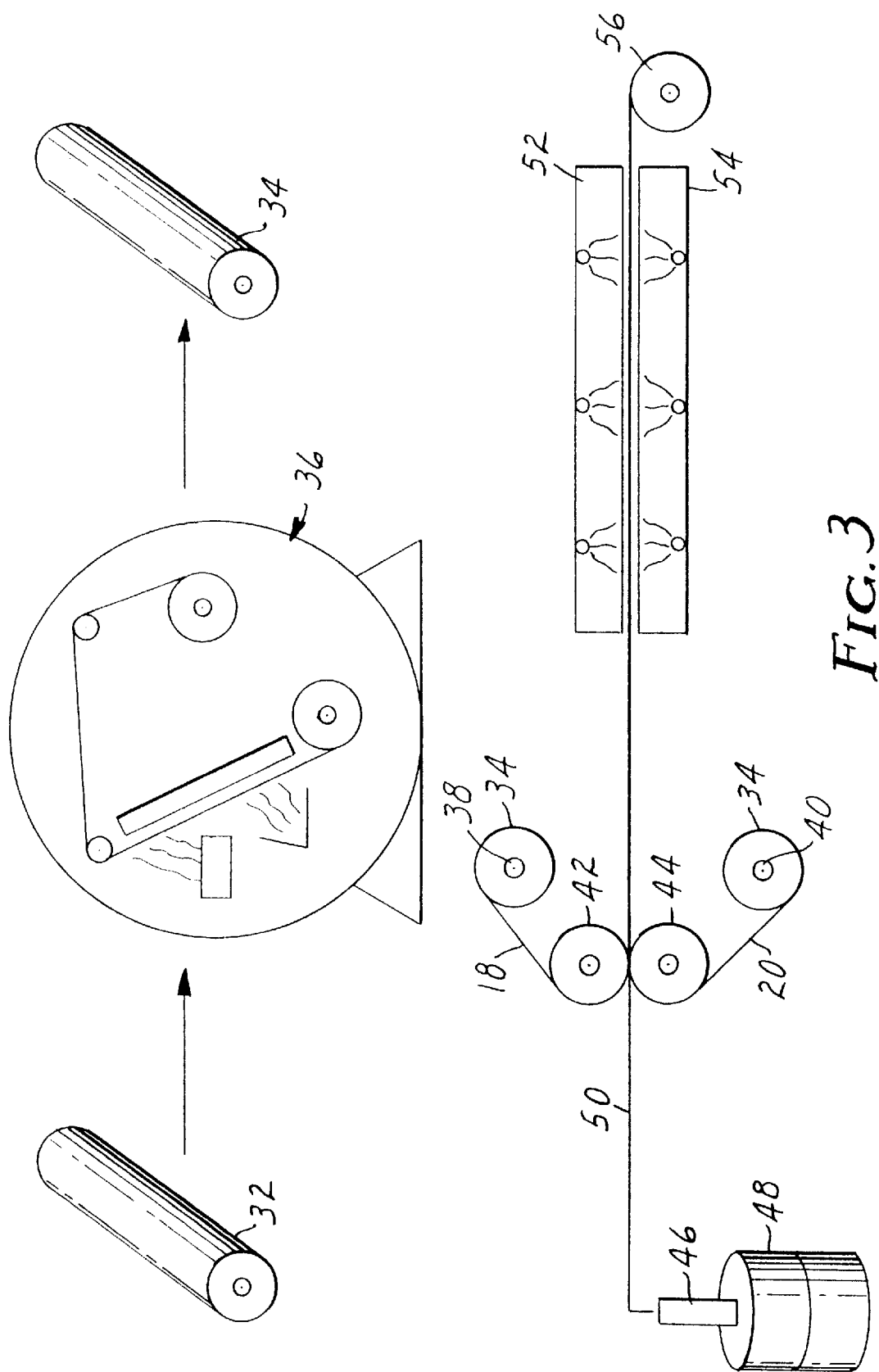
FIG. 3 is a schematic drawing illustrating a method for producing PDLC devices according to the invention.

Turning now to FIG. 3, there is shown a schematic illustration of one method for producing PDLC devices according to the invention. In order to simplify understanding of the invention, it is assumed that the first and second substrates 18 and 20 are formed of the same material although it will be understood that the substrates may be different. As an example, a large (e.g., 60 inch (152 cm) width) roll 32 of a suitable, flexible substrate material is provided and has applied thereto an at least partially transparent conductive electrode to provide a roll 34 of electrode-coated substrate. The conductive electrode may be any of the materials described hereinabove and may be applied to the substrate roll 32 by chemical vapor deposition, vacuum metalization, sputter coating or other similar techniques as are well known in the industry, the application step being identified generally by the reference numeral 36.

Separate rolls 34 of electrode-coated substrate are mounted on upper and lower rotatable spindles 38 and 40. In production, the separate rolls 34 correspond to, respectively, the first and second substrates 18 and 20. The first and second substrates 18 and 20 with the first and second electrodes 22 and 24 having been applied thereto as described above are supplied to upper and lower nip rollers 42 and 44 of a precision, two roll nip coater to bring the electrode-coated surfaces of the substrates into facing relationship. (Nip rollers 42 and 44 may be heated, if necessary, to prevent premature phase separation of the liquid crystal and polymer matrix materials.) A pump 46 feeds liquid crystal/uncured polymer matrix material blend from a reservoir 48 to the nip rollers 42 and 44 by way of conduit 50. The gap between the nip rollers 42 and 44 is adjusted so as to provide the desired PDLC film thickness. After exiting from the nip rollers, the temperature of the sandwichlike construction comprising the first and second substrates with the liquid crystal/unpolymerized matrix material therebetween is maintained (to prevent premature temperature-induced phase separation) until it is passed between two opposed banks 52 and 54 of fluorescent, low intensity UV lamps in order to polymerize the matrix material. (Preferably a continuous pull-through manufacturing process is used.) UV lamp bulbs with different spectral responses are commercially available and may be used. In general, the polymerization chemistry of matrix material and the absorption characteristics of the photoinitiator may influence bulb section. Once polymerized, the PDLC device 10 may be collected in a rolled form 56 for ease of handling.

Advantageously and contrary to known production approaches for making PDLC devices generally, the method described above for manufacturing PDLC devices employs relatively low intensity UV radiation sources having a continuous emission spectrum, where a major portion of the energy output of the source preferably falls within at least a part of the wavelength range of 280 to 450 nanometers (nm). An example of such an ultraviolet radiation source is a fluorescent lamp. Fluorescent lamps are generally understood to have two kinds of spectral power emission. One kind is a continuous spectrum provided by the fluorescent phosphor. The second kind comprises narrow bands of energy emitted by the mercury component of the lamp. Thus, a "continuous emission spectrum" is distinguished from the narrow band or line spectra afforded by other radiation sources such as high pressure mercury discharge lamps. (Known PDLC production techniques utilize relatively high intensity UV radiation sources such as mercury or mercury/xenon discharge lamps.) Preferred low intensity fluorescent lamps have an emission spectrum in the range of 280 to 450 nanometers (nm).

If the liquid crystal/polymerizable material mixture includes a photoinitiator, the emission spectrum of the UV radiation source is preferably selected so as to match the absorption spectrum of the photoinitiator, thereby maximizing absorption of the UV radiation by the photoinitiator and accelerating the curing reaction (i.e., polymerization of the uncured matrix material).

Each of fluorescent lamp banks 52 and 54 may comprise a single low intensity fluorescent lamp or a plurality thereof arranged sequentially. Although an arrangement involving a pair of opposed fluorescent lamp banks (such as illustrated in FIG. 3) is preferred, the lamps may be oriented to irradiate only one side of the substrate and liquid crystal/uncured polymer matrix material sandwich construction.

Alternatively, higher intensity UV radiation sources which have been appropriately filtered to provide low intensity radiation may be used.

Preferably the average radiation intensity of each of the fluorescent lamp banks is in the range of about 0.25 to 10 $mW/cm^2$ (more preferably in the range of about 0.5 to 5 $mW/cm^2$). Furthermore, it is preferred that the total radiation received by the sandwich construction be in the range of about 100 to 1500 $mJ/cm^2$ (50 to 750 $mJ/cm^2$ per side). The particular radiation intensity and total energy exposure requirements will vary depending on the liquid crystal, initiator and polymer matrix materials.

It is believed that after only a relatively short exposure (for example about 10 seconds) to a low intensity UV radiation source, the polymerizable material which provides the polymer matrix sufficiently gels to "lock in" the final liquid crystal droplet morphology. It is believed that once the uncured matrix material has received about 30 $mJ/cm^2$ of UV radiation per side (for example a 30 second exposure to radiation having an intensity of about 1 $mW/cm^2$ per side), the polymer matrix material will have sufficiently gelled or set to allow for the use of higher intensity UV radiation.

For example, a "two stage low intensity" UV radiation approach may be used in which a "first stage" having a radiation intensity of less than or about 3 $mW/cm^2$ is followed by a "second stage" having a radiation intensity of less than about 10 $mW/cm^2$ but greater than that used in the "first stage," both sides of the construction typically being exposed in each stage. Alternatively, after an initial UV radiation intensity exposure of less than or about 3 $mW/cm^2$, the rate of polymerization or curing of the matrix material may be accelerated by exposing one side of the partially cured (i.e., partially phase separated) system to "high intensity" UV radiation, for example, radiation having an average intensity of about 20 to 200 $mW/cm^2$ (total energy exposure in the "high intensity" stage of about 200 to 1500 $mJ/cm^2$). The actual radiation intensity and exposure requirements will vary with the liquid crystal and polymer matrix materials.

The use of low intensity UV radiation sources, as opposed to higher intensity UV sources, offers several advantages. For example, low intensity fluorescent lamps (unlike the presently used high intensity, medium or high pressure mercury and mercury/xenon radiation sources) operate at lower temperatures thereby reducing or eliminating the need for elaborate and expensive cooling systems. Infrared heating of the sample is minimal; elaborate light filters are not needed to control cure parameters. Also, low intensity fluorescent lamps can be immediately restarted following a production shut-down (unlike the mercury and mercury/xenon sources).

As noted hereinabove, it may be desirable in certain applications to provide a PDLC device comprising a film which is bonded to only one substrate or comprising a free-standing film. In the case of a PDLC device having only a single substrate, the process described above is employed except that the substrate supplied from the lower spindle 40 to the lower nip roller 44 is a 25μ polyester film which has not had electrode material applied thereto. Once the uncured polymeric matrix material has been polymerized upon exposure to UV radiation, the untreated polyester film is peeled away. In the case of a free-standing PDLC film, neither substrate in the above described process is provided with electrode material. After the matrix material has polymerized upon exposure to UV radiation, both substrates are removed.

Whether the PDLC device is supplied as a free-standing film, with one substrate, or with two substrates, the device may be applied to a surface such as a motor vehicle sunroof, a motor vehicle side window, or an architectural window with, for example, a suitable adhesive. (Preferably, the adhesive is optically transparent.) As noted hereinabove, by varying the magnitude of the electric field with the variable power supply 30, a user of the variable grey scale PDLC device 10 can selectively adjust the amount of specular light transmitted therethrough. The device 10 can be adjusted to have 0% relative transmission, 100% relative transmission, or an infinite number of intermediate specular light transmission levels. As the device transitions between the translucent off-state and the transparent on-state, the device preferably has a uniform, even appearance.

It should also be emphasized that the above described process provides unique advantages over those production methods which are presently known. Whereas other PDLC devices require the use of presized mechanical spacers (poly(methyl methacrylate) balls, silica particles, and the like) to maintain constant spacing between the substrates and the electrodes and hence a substantially equal PDLC film thickness, the present invention requires no spacers. Spacing between the substrates is controlled by mechanically adjusting the gap between the nip rollers. The elimination of mechanical spacers and the use of a precision two roll nip coater allows for the production of thin, flexible, conformable PDLC devices having thin substrates. Most examples in the reference literature discuss the use of glass substrates and the presently known, commercially available structures include 7 mil (178μ) substrates which provide limited flexibility and virtually no conformability.

The invention will be more fully understood with reference to the following examples which are not to be construed as limiting the scope of the invention.

General Preparation of a PDLC Device

A PDLC device was formed as described below. Equal parts by weight of LICRISTAL E7 liquid crystal material and NOA65 polymer matrix material were combined with heating and stirring until the liquid crystal material completely dissolved. The liquid crystal/uncured polymer matrix material blend was poured between a pair of 25μ thick polyester films which previously had been coated with a silver electrode material on one surface of each film. The two films were held with their electrode-coated surfaces in facing relationship by the nip rollers of a precision two roll nip coater. The gap between the nip rollers was set to provide a liquid crystal material/uncured polymer matrix material film thickness of 15 to 18μ.

The uncured polymer matrix material was polymerized by positioning the sandwichlike construction comprising the two electrode-coated substrates and the liquid crystal material/unpolymerized matrix material between a pair of opposed banks of fluorescent black light phosphor lighting elements, each bank being positioned to illuminate one of the polyester films. Lighting elements having a spectral distribution between 300 to 400 nm and a maximum output at 351 nm were employed.

The lighting elements were adjusted so as to provide an average intensity of 1 to 2 mW/cm$^2$ through each electrode-coated polyester film (i.e., per side). Each side of the sandwichlike construction received a total energy exposure of 100 millijoules/sq. cm (mJ/cm$^2$). The construction as a whole was exposed to a total energy of 200 mJ/cm$^2$. The level of incident radiation was determined with an EIT low intensity UVIMAP radiometer or UVIRAD radiometer each having a spectral response in the range of 300 to 400 nm and a maximum response at 358 nm.

Electrically conductive adhesive tape was secured to a portion of each electrode-coated substrate that had not had liquid crystal/uncured matrix material applied thereto. Each tape was then connected to an alternating current (AC) power supply having a variable voltage output.

EXAMPLES 1–10

A series of PDLC devices was prepared as described above in the general preparation except that the particular liquid crystal material employed was varied as shown below in Table 1. In examples 1 and 2, the average intensity of the UV radiation was 1.1 mW/cm$^2$ per side. In examples 3 to 7, the average intensity of the UV radiation was 2 mW/cm$^2$ per side and the total energy to which the entire structure was exposed was 300 mJ/cm$^2$ (150 mJ/cm$^2$ per side). In examples 8 to 10, the average intensity was 2 mW/cm$^2$ per side and the total energy was 200 mJ/cm$^2$ (100 mJ/cm$^2$ per side). The optical performance of each PDLC device was evaluated by measuring the applied voltage necessary to provide various levels of specular light transmission through the device and graphically plotting the data to provide a % T v. applied voltage curve as described above. The curve labeled with the reference letter A in FIG. 2 is based on an evaluation of the PDLC device of example 2.

More specifically, specular transmission (% T) for a particular applied voltage was measured with a Perkin-Elmer LAMBDA 9 spectrophotometer having an integrating sphere. Measurements were made at a wavelength of 550 nm. The acceptance angle of the optical system was between 3° and 4°. PDLC samples were switched with a VARIAC variable AC power supply operating at a frequency of 60 hz.

Table 1 reports values for ΔV, as described more fully hereinabove.

TABLE 1

| Example No. | Liquid Crystal Material[1] | ΔV |
| --- | --- | --- |
| 1 | E7 | 34 |
| 2 | BL009 | 23 |
| 3 | ML1005 | 40 |
| 4 | ML1008 | 33 |
| 5 | 17151 | 51 |
| 6 | 17153 | 43 |
| 7 | 17315 | 30 |
| 8 | BL006 | 51 |
| 9 | 17722 | 21 |
| 10 | 17723 | 21 |

[1]The liquid crystal materials are identified by their commercial trade designation. All liquid crystal materials are commercially available from EM Industries, Hawthorne, NY.

Table 1 shows that a wide variety of liquid crystal materials may be employed in PDLC devices according to the invention. The switching curve for each example had a ΔV of at least 21 V and exhibited a uniform visual appearance upon transitioning between the translucent off-state and the transparent on-state.

Figure 4:
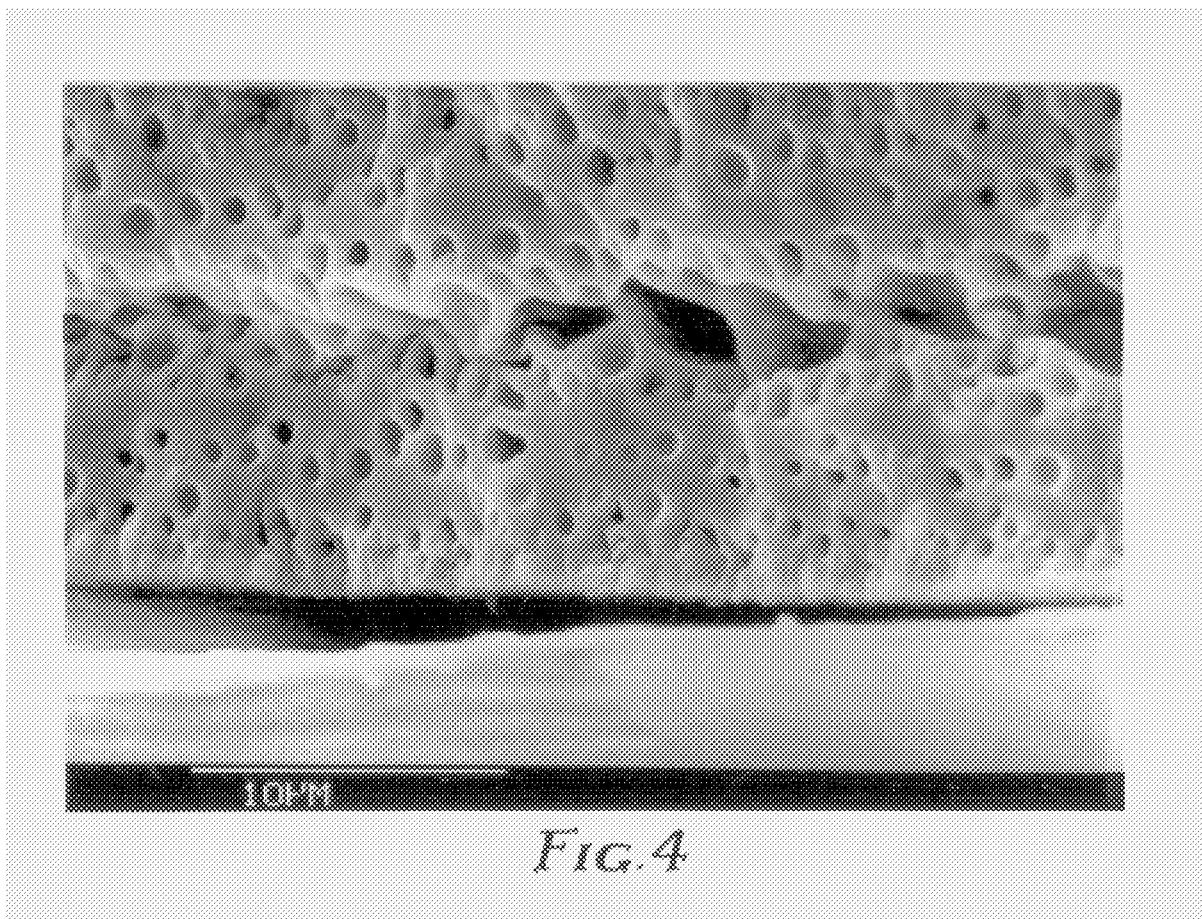
FIG. 4 is a photomicrograph (enlarged 3000x) of a PDLC device formed according to the invention.

With reference to FIG. 4, a photomicrograph (enlarged 3000×) of the PDLC device of example 2, the liquid crystal droplets range in size from about $0.1\mu$ to about $3\mu$. The range of droplet sizes allows, at least in part, for the PDLC device to gradually, smoothly and uniformly transition from the translucent off-state, through an infinite number of intermediate states, to the transparent on-state. Droplets of different size require different applied voltages in order to switch. Some of the droplets exhibit a nonuniform shape.

FIG. 4 also shows that liquid crystal droplets clustered near opposed, major planar surfaces of the PDLC film tend to be smaller in size than droplets clustered in a zone intermediate areas adjacent to the major planar surfaces.

EXAMPLE 11

A PDLC device was prepared as described above in the general preparation except that the liquid crystal material was BL009, the polymer matrix material was NOA68, the UV radiation average intensity was 2 mW/cm² per side, and the total energy to which the construction was exposed was 300 mJ/cm² (150 mJ/cm² per side). The optical performance of the device was evaluated as described above. In a graph of % T v. applied voltage, the device of example 11 had a ΔV of 30 V and displayed a uniform visual appearance upon transitioning between the translucent off-state and the transparent on-state.

EXAMPLES 12–14

A series of PDLC devices was prepared as described above in the general preparation to observe the effect of varying the thickness of the substrates. Substrate thickness and the liquid crystal material were varied as shown below in Table 2. In examples 12 and 13 the UV radiation average intensity was 1.92 mW/cm² per side and the total energy was 191 mJ/cm² (95.5 mJ/cm² per side). In example 14 the UV radiation average intensity was 1.1 mW/cm² per side and the total energy exposure was 100 mJ/cm² (50 mJ/cm² per side).

TABLE 2

| Example No. | Liquid Crystal Material[1] | Substrate Thickness ($\mu$) | ΔV |
| --- | --- | --- | --- |
| 12 | E7 | 51 | 22 |
| 13 | BL009 | 51 | 22 |
| 14 | BL009 | 178 | 37 |

[1]The liquid crystal materials are identified by their commercial trade designation. All liquid crystal materials are commercially available from EM Industries, Hawthorne, NY.

In each example, the PDLC device had a ΔV greater than 20 V and exhibited a uniform visual appearance upon transitioning between the translucent off-state and the transparent on-state. The grey scale performance of a PDLC device was not materially affected by varying the substrate thickness.

EXAMPLES 15–17

A series of PDLC devices was prepared as described above in the general preparation with the exception that the liquid crystal material was BL009. The average intensity of the UV radiation was 1.1 mW/cm² per side and the total energy exposure was 100 mJ/cm² (50 mJ/cm² per side). The proportions of liquid crystal material and polymer matrix material were varied as shown below in Table 3. The liquid crystal material and polymer matrix material amounts are reported in parts by weight.

TABLE 3

| Example No. | Amount of Liquid Crystal Material | Amount of Polymer Matrix Material | ΔV |
| --- | --- | --- | --- |
| 15 | 40 | 60 | 20 |
| 16 | 50 | 50 | 17 |
| 17 | 60 | 40 | 29 |

Each example had a ΔV of at least 15 V and exhibited a uniform visual appearance upon transitioning between the translucent off-state and the transparent on-state. Increasing the proportion of liquid crystal material decreased the percentage of specular light transmitted through the device in the off-state and reduced the maximum % T.

EXAMPLES 18–19

A series of PDLC devices was prepared as described above in the general preparation except that the liquid crystal material was BL009, the parts by weight ratio of liquid crystal material to polymer matrix material was 60:40, and the thickness of the liquid crystal material/polymer matrix PDLC film was varied as shown below in Table 4. The average intensity of the UV radiation was 1.1 mW/cm² per side and the total energy exposure was 100 mJ/cm² (50 mJ/cm² per side).

TABLE 4

| Example No. | PDLC Film Thickness ($\mu$) | ΔV |
| --- | --- | --- |
| 18 | 8 | 19 |
| 19 | 10 | 33 |
| 17 | 18 | 29 |

Each device had a ΔV of at least 15 V and exhibited a uniform visual appearance upon transitioning between the translucent off-state and the transparent on-state. It was observed that thinner films had an increased % T at 0 applied volts (corresponding to the off-state condition) than did thicker films.

EXAMPLE 20

A PDLC device was prepared as described above in the general preparation except that the electrode material was indium tin oxide on a $178\mu$ thick polyester film. The average intensity of the UV radiation was 1.1 mW/cm² per side and the total energy exposure was 100 mJ/cm² (50 mJ/cm² per side). The device had a ΔV of 37 V and demonstrated a uniform visual appearance upon transitioning between the translucent off-state and the transparent on-state. Changing the electrode material did not materially adversely affect the performance of the device.

EXAMPLES 21–22

In example 21, a PDLC device was prepared as described above in the general preparation except that the LICRISTAL E7 liquid crystal material was supplemented with 0.1% (by weight of the LICRISTAL E7) of CB15, a cholesteric liquid crystal material comprising a cyanobiphenyl mixture having a 2-methylbutyl alkyl group and commercially available from EM Industries. The average intensity of the UV radiation was 1.1 mW/cm² per side. The total energy exposure was 100 mJ/cm² (50 mJ/cm² per side). Example 22 paralleled example 21 except that the LICRISTAL E7 was replaced by BL009. The electrodes of examples 21 and 22 included a thin, protective, passivating dielectric layer. Each device had a ΔV of 23 V and demonstrated a uniform visual appearance upon transitioning between the translucent off-state and the transparent on-state. These examples show that cholesteric liquid crystal materials may be used in accordance with the invention.

Examples 23 to 27 below illustrate the benefit of reducing or preventing premature, thermally-induced phase separation by heating the nip rollers and/or regulating the air temperature in the zone preceding and into the zone containing the low intensity fluorescent lamps. The particular air and nip roll temperatures are a function of the liquid crystal and polymer matrix materials. In each example, the temperatures were selected to allow for the creation of well-formed liquid crystal droplets. The thickness of each substrate in examples 23 to 27 was about 50μ. The electrodes in each of examples 23 to 27 included a thin, protective, passivating dielectric layer of $Al_2O_3$.

EXAMPLE 23

A PDLC device was prepared according to the general preparation except that the liquid crystal material was 17723 (BL036) and the thickness of the PLDC film was about 20μ. Furthermore, the nip rollers were maintained at about 85° F. (29° C.) and the air temperature in the zone preceding and into the zone containing the fluorescent lamps was maintained at about 90° F. (32° C.). Each side of the sandwich construction comprising the pair of electrode-coated substrates and the liquid crystal material/uncured polymer matrix material was first exposed to UV radiation of 1 mW/cm² average intensity for about 10 seconds followed by a subsequent average intensity exposure of 2 mW/cm2 for 2 minutes for a total subsequent energy exposure of 480 mJ/cm² (240 mJ/cm² per side). The resulting PDLC device included a multiplicity of liquid crystal droplets having sizes ranging from about 0.6 to about 2.2μ dispersed in the cured polymer matrix. The device exhibited a ΔV of 35 V and a uniform visual appearance upon transitioning between the translucent off-state and the transparent on-state.

EXAMPLE 24

A 20μ thick PDLC device was prepared according to example 23 except that the temperature of the nip rollers was about 92° F. (33° C.), the air temperature in the zone preceding and into the zone containing the fluorescent light banks was about 92° F. (33° C.), the initial average UV radiation intensity was 0.5 mW/cm² per side (30 mJ/cm² total energy exposure, 15 mJ/cm² per side), and the subsequent UV radiation exposure was provided by a 200 Watt/inch high intensity mercury lamp with an average intensity of 24 mW/cm². (Total energy exposure was 1159 mJ/cm² and the cure time was 40 seconds.) The liquid crystal droplets in the resulting PDLC device ranged in size from 1.1 to 3.2μ. The device exhibited a ΔV of 26 V and a uniform visual appearance upon transitioning between the translucent off-state and the transparent on-state.

EXAMPLE 25

A 20μ thick PDLC device was prepared according to example 23 except that the polymer matrix material was blended with 0.5% by weight (based on the weight of the polymer matrix) of AEROSIL R 972 hydrophobic fumed silica using a high speed air mixer. The liquid crystal material was then added and thoroughly mixed to provide a uniform dispersion. The temperature of the nip rollers was about 93° F. (34° C.) and the air temperature in the zone preceding and into the zone containing the fluorescent light banks was about 92° F. (33° C.). The sandwich construction was cured for eight minutes under a low intensity UV radiation source that provided an average intensity of 0.54 mW/cm² per side and a total energy exposure of 518 mJ/cm² (259 mJ/cm² per side). The liquid crystal droplets in the resulting PDLC device ranged in size from 0.8 to 2.7μ. The PDLC device displayed a ΔV of 35 V and a uniform visual appearance upon transitioning between the translucent off-state and the transparent on-state.

EXAMPLE 26

Figure 5:
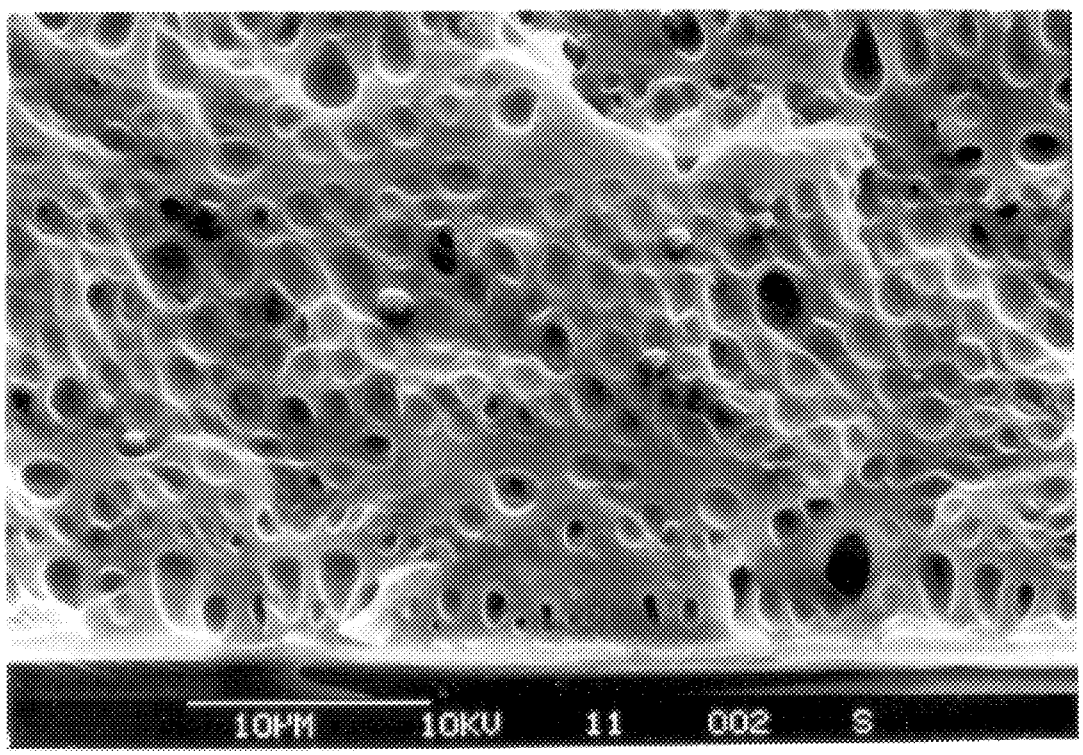
FIG. 5 is a photomicrograph (enlarged 2500x) of a PDLC device formed according to the invention.

A 20μ thick PDLC device was prepared according to the procedure of example 23 except that the liquid crystal material was BL009. The temperature of the nip rollers was about 110° F. (43° C.) and the air temperature in the zone preceding and into the zone containing the fluorescent lamps was about 120° F. (49° C.). (Higher temperatures were required to prevent the premature temperature-induced phase separation of the BL009 liquid crystal material as compared to the BL036 liquid crystal material.) The intensity of the initial UV radiation exposure was 0.72 mW/cm² per side for 10 seconds (total energy exposure=14 mJ/cm²; 7 mJ/cm² per side). The subsequent UV radiation exposure provided an intensity of 2.4 mW/cm² per side and a total energy of 288 mJ/cm² per side. With reference to FIG. 5, a photomicrograph (enlarged 2500×) of the PDLC device of example 26, the resulting liquid crystal droplets were well formed and ranged in size from 0.7 to 2μ. The PDLC device demonstrated a ΔV of 33 V and a uniform, visual appearance upon transitioning between the translucent off-state and the transparent on-state.

EXAMPLE 27

A PDLC device was prepared according to the procedure of example 23 except that the liquid crystal material was LICRISTAL E7 and the thickness of the PDLC film was about 15μ. The temperature of the nip rollers was about 67° F. (19° C.) and the air temperature in the zone preceding and into the zone containing the fluorescent lamp banks was about 70° F. (21° C.). The sandwich construction was exposed to low intensity UV radiation (average intensity= 1.7 mW/cm² per side) for 2 minutes (total energy exposure of 418 mJ/cm², 209 mJ/cm² per side). The liquid crystal droplets ranged in size from 0.5 to 1.6μ. The resulting PDLC device had a ΔV of 20 V and exhibited a uniform visual appearance upon transitioning between the translucent off-state and the transparent on-state.

Reasonable variations or modifications are possible within the scope of the foregoing specification and drawings without departing from the spirit of the invention which is defined in the accompanying claims.

The embodiments for which an exclusive property or privilege is claimed are defined as follows:

1. A liquid crystal-containing sandwich construction comprising:
   a first flexible, polymeric substrate having an electrode material on one major surface thereof;
   a second flexible, polymeric substrate having an electrode material on one major surface thereof, the major surfaces of the first and second substrates having electrode material thereon being in a facing relationship; and
   a liquid crystal-containing layer comprising a liquid crystal material blended with an ultraviolet radiation polymerizable liquid medium, the layer being disposed between the major surfaces of the first and second substrates having electrode material thereon;

wherein the sandwich construction is free from mechanical spacers that separate the major surfaces of the first and second substrates and control the thickness of the liquid crystal-containing layer therebetween.

2. A liquid crystal-containing sandwich construction according to claim 1 wherein the liquid crystal material is selected from the group consisting of birefringent chiral nematic type liquid crystal material, chiral nematic type liquid crystal material, cholesteric type liquid crystal material, and mixtures thereof.

3. A liquid crystal-containing sandwich construction according to claim 2 wherein the liquid crystal material has at least one nematic mesophase.

4. A liquid crystal-containing sandwich construction according to claim 1 wherein the liquid crystal material has an optical anisotropy in the range of about 0.01 to 0.5.

5. A liquid crystal-containing sandwich construction according to claim 1 wherein the parts by weight ratio of the liquid crystal material to the ultraviolet radiation polymerizable medium is in the range of 40:60 to 60:40.

6. A device according to claim 1 wherein each of the first and second substrates is a polyester or a copolyester.

7. A liquid crystal containing sandwich construction according to claim 1 wherein each of the first and second substrates is at least partially transparent.

8. A device according to claim 1 wherein each of the first and second substrates is about 25 to 50 microns thick.

9. A liquid crystal containing sandwich construction according to claim 1 wherein each of the first and second electrodes is formed of a material selected from the group consisting of chromium, indium oxide, tin oxide, stainless steel, indium tin oxide, gold, silver, copper, aluminum, titanium, cadmium stanate, and mixtures and alloys thereof.

10. A liquid crystal-containing sandwich construction according to claim 1 wherein each of the first and second substrates is a polyester or a copolyester.

11. A liquid crystal-containing sandwich construction according to claim 10 wherein each of the first and second substrates is about 25 to 50 microns thick.

12. A liquid crystal-containing sandwich construction according to claim 1 wherein the ultraviolet radiation polymerizable medium comprises materials that are selected from the group consisting of alkyl acrylates or methacrylates, acrylated or methacrylated polyurethanes, acrylated or methacrylated polyesters, acrylated or methacrylated polyols, acrylated or methacrylated polybutadienes, acrylated or methacrylated epoxies, and mixtures thereof.

13. A liquid crystal-containing sandwich construction according to claim 1 wherein the ultraviolet radiation polymerizable medium comprises (a) an allyl compound selected from the group consisting of monoallyl compounds, polyallyl compounds and mixtures thereof and (b) a polythiol selected from the group consisting of $Z[OCO(CH_2)_nSH]_m$ wherein Z=a polyvalent organic moiety which is a $CH_{0-3}$ group-containing nucleus of a tri- or tetravalent alcohol of the type of glycerol or pentaerythritol, m=3 or 4, and n=1 to 5.

14. A liquid crystal-containing sandwich construction according to claim 1 wherein the ultraviolet radiation polymerizable medium comprises (a) first material that comprises the reaction product of an allyl compound selected from the group consisting of monofunctional allyl compounds containing an hydroxyl group, multifunctional allyl compounds containing an hydroxyl group, and mixtures thereof and (2) a mono-or multifunctional isocyanate; (b) a polythiol selected from the group consisting of $Z[OCO(CH_2)SH]_m$ wherein Z=a polyvalent organic moiety which is a $CH_{0-3}$ group-containing nucleus of a tri- or tetravalent alcohol of the type of glycerol or pentaerythritol, m=3 or 4, and n=1 to 5; and (c) and an optional third material that is a mono-, di-, or triallyl functional compound that can react with the polythiol.

15. A liquid crystal-containing sandwich construction according to claim 1 wherein the ultraviolet polymerizable medium comprises (a) an acrylate compound selected from the group consisting of monofunctional acrylates, monofunctional methacrylates, multifunctional acrylates, multifunctional methacrylates, and mixtures thereof and (b) a polythiol selected from the group consisting of $Z[OCO(CH_2)_nSH]_m$ wherein Z=a polyvalent organic moiety which is a $CH_{0-3}$ group-containing nucleus of a tri- or tetravalent alcohol of the type of glycerol or pentaerythritol, m=3 or 4, and n=1 to 5.

16. A liquid crystal-containing sandwich construction according to claim 1 wherein the liquid crystal-containing layer further comprises a photoinitiator.

17. A liquid crystal-containing sandwich construction according to claim 1 wherein the ultraviolet radiation polymerizable medium comprises (a) a multifunctional allyl; (b) a polythiol selected from the group consisting of $Z[OCO(CH_2)_mSH]_m$ wherein Z is a polyvalent organic moiety which is a $CH_{0-3}$ group-containing nucleus of a tri- or tetravalent alcohol of the type of glycerol or pentaerythritol, m=3 or 4, and n=1 to 5; and (c) an acrylate selected from the group consisting of monofunctional acrylates, monofunctional methacrylates, and mixtures thereof.

18. A liquid crystal-containing sandwich construction according to claim 1 wherein the ultraviolet radiation polymerizable medium comprises (a) a multifunctional allyl; (b) a polythiol selected from the group consisting of $Z[OCO(CH_2)_mSH]_m$ wherein Z is a polyvalent organic moiety which is a $CH_{0-3}$ group-containing nucleus of a tri- or tetravalent alcohol of the type of glycerol or pentaerythritol, m=3 or 4, and n=1 to 5; (c) an acrylate selected from the group consisting of monofunctional acrylates, monofuctional methacrylates, and mixtures thereof; and (d) a monoallyl.

19. A liquid crystal-containing sandwich construction according to claim 1 wherein the ultraviolet radiation polymerizable medium comprises (a) a multifunctional allyl; (b) a polythiol selected from the group consisting of $Z[OCO(CH_2)_mSH]_m$ wherein Z is a polyvalent organic moiety which is a $CH_{0-3}$ group-containing nucleus of a tri- or tetravalent alcohol of the type of glycerol or pentaerythritol, m=3 or 4, and n=1 to 5; and (c) an acrylate selected from the group consisting of multifunctional acrylates, multifunctional methacrylates, and mixtures thereof.

20. A liquid crystal-containing sandwich construction according to claim 1 wherein the ultraviolet radiation polymerizable medium comprises (a) a multifunctional allyl; (b) a polythiol selected from the group consisting of $Z[OCO(CH_2)_mSH]_m$ wherein Z is a polyvalent organic moiety which is a $CH_{0-3}$ group-containing nucleus of a tri- or tetravalent alcohol of the type of glycerol or pentaerythritol, m=3 or 4, and n=1 to 5; (c) an acrylate selected from the group consisting of multifunctional acrylates, multifunctional methacrylates, and mixtures thereof; and (d) a monoallyl.

21. A liquid crystal-containing sandwich construction according to claim 1 wherein the ultraviolet radiation polymerizable medium comprises (a) a multifunctional allyl; and (b) an acrylate selected from the group consisting of multifunctional acrylates, multifunctional methacrylates, and mixtures thereof.

22. A liquid crystal-containing sandwich construction according to claim 1 wherein the ultraviolet radiation polymerizable medium comprises (a) a multifunctional allyl; and (b) an acrylate selected from the group consisting of monofunctional acrylates, monofunctional methacrylates, and mixtures thereof.

23. A liquid crystal-containing sandwich construction according to claim 1 wherein the ultraviolet radiation polymerizable medium comprises (a) a monofunctional allyl; (b) a polythiol selected from the group consisting of $Z[OCO(CH_2)_mSH]_n$ wherein Z is a polyvalent organic moiety which is a $CH_{0-3}$ group-containing nucleus of a tri- or tetravalent alcohol of the type of glycerol or pentaerythritol, m=3 or 4, and n=1 to 5; and (c) an acrylate selected from the group consisting of multifunctional acrylates, multifunctional methacrylates, and mixtures thereof.

24. A liquid crystal-containing sandwich construction according to claim 1 wherein the ultraviolet radiation polymerizable medium comprises (a) a monofunctional allyl; (b) a polythiol selected from the group consisting of $Z[OCO(CH_2)_mSH]_n$ wherein Z is a polyvalent organic moiety which is a $CH_{0-3}$ group-containing nucleus of a tri- or tetravalent alcohol of the type of glycerol or pentaerythritol, m=3 or 4, and n=1 to 5; and (c) an acrylate selected from the group consisting of monofunctional acrylates, monofunctional methacrylates, and mixtures thereof.

25. A liquid crystal-containing sandwich construction according to claim 1 wherein the sandwich construction has a thickness which does not exceed about 254 microns.

26. A liquid crystal-containing sandwich construction according to claim 1 wherein the liquid crystal-containing layer has a substantially equal thickness.

27. A liquid crystal-containing sandwich construction according to claim 1 wherein the liquid crystal-containing layer forms a polymer dispersed liquid crystal film of substantially equal thickness and comprising a multiplicity of droplets of a liquid crystal material dispersed in an ultraviolet radiation polymerized matrix when the liquid crystal-containing layer is subjected to ultraviolet radiation.

28. A flexible film construction comprising:
  a first flexible, polymeric substrate having an electrode material on one major surface thereof,
  a second flexible, polymeric substrate having an electrode material on one major surface thereof, the major surfaces of the first and second substrates having electrode material thereon being in a facing relationship;
  wherein the first and second substrates are separated from each other only by a layer of liquid that is disposed between the major surfaces of the substrates having electrode material thereon, the layer of liquid comprising a liquid crystal material and an ultraviolet radiation polymerizable liquid.

29. A flexible film construction according to claim 28 wherein the layer of liquid is capable of forming a polymer dispersed liquid crystal film comprising a multiplicity of droplets of a liquid crystal material dispersed in an ultraviolet radiation polymerized matrix when subjected to ultraviolet radiation.

30. A flexible film construction according to claim 28 wherein the homogeneous liquid solution is capable of forming a polymer dispersed liquid crystal film comprising a multiplicity of droplets of a liquid crystal material dispersed in an ultraviolet radiation polymerized matrix when subjected to ultraviolet radiation.

31. A flexible film construction according to claim 28 wherein the film construction has a thickness which does not exceed about 254 microns.

32. A flexible film construction according to claim 28 wherein the layer of liquid has a substantially equal thickness.

33. A flexible film construction according to claim 28 wherein the layer of liquid forms a polymer dispersed liquid crystal film of substantially equal thickness and comprising a multiplicity of droplets of a liquid crystal material dispersed in an ultraviolet radiation polymerized matrix when the layer of liquid is subjected to ultraviolet radiation.

34. A flexible film construction comprising:
  a first flexible, polymeric substrate having an electrode material on one major surface thereof;
  a second flexible, polymeric substrate having an electrode material on one major surface thereof, the major surfaces of the first and second substrates having electrode material thereon being in a facing relationship; and
  a homogeneous liquid solution disposed between the major surfaces of the first and second substrates having electrode material thereon, the homogeneous liquid solution comprising a liquid crystal material and an ultraviolet radiation polymerizable liquid;
  wherein the film construction is free from mechanical spacers that separate the major surfaces of the first and second substrates and control the thickness of the homogeneous liquid solution therebetween.

35. A flexible film construction according to claim 34 wherein the film construction has a thickness which does not exceed about 254 microns.

36. A flexible film construction according to claim 34 wherein the layer of liquid has a substantially equal thickness.

37. A flexible film construction according to claim 34 wherein the layer of liquid forms a polymer dispersed liquid crystal film of substantially equal thickness and comprising a multiplicity of droplets of a liquid crystal material dispersed in an ultraviolet radiation polymerized matrix when the layer of liquid is subjected to ultraviolet radiation.

38. A film construction comprising:
  a first flexible, polymeric substrate having an electrode material on one major surface thereof;
  a second flexible, polymeric substrate having an electrode material on one major surface thereof, the major surfaces of the first and second substrates having electrode material thereon being in a facing relationship;
  wherein the first and second substrates are separated from each other only by a layer of liquid that is disposed between the major surfaces of the substrates having electrode material thereon, the layer of liquid comprising a liquid crystal material and an ultraviolet radiation polymerizable liquid, and further wherein the film construction is not in fixed supportive contact with a rigid plate.

39. A film construction according to claim 38 wherein the film construction has a thickness which does not exceed about 254 microns.

40. A film construction according to claim 38 wherein the layer of liquid has a substantially equal thickness.

41. A film construction according to claim 38 wherein the layer of liquid forms a polymer dispersed liquid crystal film of substantially equal thickness and comprising a multiplicity of droplets of a liquid crystal material dispersed in an ultraviolet radiation polymerized matrix when the layer of liquid is subjected to ultraviolet radiation.

42. A film construction comprising:

a first flexible, polymeric substrate having an electrode material on one major surface thereof;

a second flexible, polymeric substrate having an electrode material on one major surface thereof, the major surfaces of the first and second substrates having electrode material thereon being in a facing relationship; and a homogeneous liquid solution disposed between the major surfaces of the first and second substrates having electrode material thereon, the homogeneous liquid solution comprising a liquid crystal material and an ultraviolet radiation polymerizable liquid;

wherein the film construction is free from mechanical spacers that separate the major surfaces of the first and second substrates and control the thickness of the homogeneous liquid solution therebetween, and further wherein the film construction is not in fixed supportive contact with a rigid plate.

43. A film construction according to claim 42 wherein the film construction has a thickness which does not exceed about 254 microns.

44. A film construction according to claim 42 wherein the layer of liquid has a substantially equal thickness.

45. A film construction according to claim 42 wherein the layer of liquid forms a polymer dispersed liquid crystal film of substantially equal thickness and comprising a multiplicity of droplets of a liquid crystal material dispersed in an ultraviolet radiation polymerized matrix when the layer of liquid is subjected to ultraviolet radiation.

46. A method of preparing a light transmission device comprising:

(a) providing a liquid crystal-containing sandwich construction comprising:

a first flexible, polymeric substrate having an electrode material on one major surface thereof;

a second flexible, polymeric substrate having an electrode material on one major surface thereof, the major surfaces of the first and second substrates having electrode material thereon being in a facing relationship; and a liquid crystal-containing layer comprising a liquid crystal material blended with an ultraviolet radiation polymerizable liquid medium, the layer being disposed between the major surfaces of the first and second substrates having electrode material thereon;

wherein the sandwich construction is free from mechanical spacers that would otherwise separate the major surfaces of the first and second substrates and control the thickness of the liquid crystal-containing layer therebetween; and (b) exposing the liquid crystal-containing layer to ultraviolet radiation to form a polymer dispersed liquid crystal film of substantially equal thickness that comprises a multiplicity of droplets of liquid crystal material dispersed in an ultraviolet radiation polymerized matrix.

* * * * *